US011812727B2

(12) United States Patent
Lepek et al.

(10) Patent No.: US 11,812,727 B2
(45) **Date of Patent: *Nov. 14, 2023**

(54) MISSION PLANNER FOR THE AERIAL RELEASE OF MOSQUITOES

(71) Applicant: Senecio Ltd., Kfar-Saba (IL)

(72) Inventors: Hanan Lepek, Kfar-Saba (IL); Ralph Breslauer, St. Augustine, FL (US)

(73) Assignee: Senecio Ltd., Kfar-Saba (IL)

( * ) Notice: Subject to any disclaimer, the term of this patent is extended or adjusted under 35 U.S.C. 154(b) by 231 days.

This patent is subject to a terminal disclaimer.

(21) Appl. No.: 17/201,211

(22) Filed: Mar. 15, 2021

(65) Prior Publication Data

US 2021/0195866 A1 Jul. 1, 2021

Related U.S. Application Data

(62) Division of application No. 16/082,306, filed as application No. PCT/IL2017/050303 on Mar. 9, 2017, now Pat. No. 10,945,410.

(Continued)

(51) Int. Cl.
*A01K 1/08* (2006.01)
*A01M 1/02* (2006.01)
(Continued)

(52) U.S. Cl.
CPC ............... *A01K 1/08* (2013.01); *A01M 1/026* (2013.01); *A01M 1/106* (2013.01); *B60P 3/04* (2013.01);
(Continued)

(58) Field of Classification Search
CPC ......... A01K 1/08; A01M 1/026; A01M 1/106; G01C 21/005; G01C 21/34; G01C 21/345; B64U 2201/10; B64U 2101/00
See application file for complete search history.

(56) References Cited

U.S. PATENT DOCUMENTS

| | | | |
|---|---|---|---|
| 1,569,196 | A | 1/1926 | McDaniel |
| 4,260,108 | A | 4/1981 | Maedgen, Jr. |

(Continued)

FOREIGN PATENT DOCUMENTS

| | | |
|---|---|---|
| CA | 2688976 | 6/2011 |
| WO | WO 2009/067089 | 5/2009 |

(Continued)

OTHER PUBLICATIONS

Anaman et al. "Benefit-Cost Analysis of the Use of Sterile Insect Technique to Eradicate Screwworm Fly in the Event of an Invasion of Australia", Preventive Veterinary Medicine, XP023844286, 20(1-2): 79-98, Jul. 1, 1994. Fig.2, p. 87, Lines 5-19. (Year: 1994)*

(Continued)

*Primary Examiner* — Richard G Davis

(57) ABSTRACT

A method and system for preparing a distribution program for insects comprises obtaining distribution data of a wild population of insects; obtaining distribution parameters including distribution resolution levels of at least one available distribution vehicle; generating a population density map at a resolution level consistent with the distribution resolution level of the vehicle; generating a release map by modifying the population density map in accordance with the distribution parameters; and generating a path using the release map, the path defining dosages of insects to be released at respective locations along the path.

17 Claims, 18 Drawing Sheets

Related U.S. Application Data

(60) Provisional application No. 62/306,224, filed on Mar. 10, 2016.

(51) Int. Cl.

| | |
|---|---|
| ***A01M 1/10*** | (2006.01) |
| ***B64D 1/00*** | (2006.01) |
| ***B60P 3/04*** | (2006.01) |
| ***B64C 39/02*** | (2023.01) |
| ***G01C 21/00*** | (2006.01) |
| ***G01C 21/34*** | (2006.01) |
| *B64U 101/00* | (2023.01) |

(52) U.S. Cl.

CPC .............. *B64C 39/024* (2013.01); *B64D 1/00* (2013.01); *G01C 21/005* (2013.01); *G01C 21/3407* (2013.01); *G01C 21/3453* (2013.01); *B64U 2101/00* (2023.01); *B64U 2201/10* (2023.01); *Y02A 50/30* (2018.01)

(56) References Cited

U.S. PATENT DOCUMENTS

| | | | | |
|---|---|---|---|---|
| 5,148,989 | A | 9/1992 | Skinner | |
| 5,751,576 | A | 5/1998 | Monson | |
| 5,794,847 | A | 8/1998 | Stocker | |
| 5,907,923 | A * | 6/1999 | Heath | A01N 37/02 43/107 |
| 8,408,164 | B2 * | 4/2013 | Robinson, Jr. | A01K 67/033 119/6.5 |
| 8,967,029 | B1 | 3/2015 | Calvert | |
| 9,428,272 | B2 | 8/2016 | Markov | |
| 2004/0093190 | A1 | 5/2004 | Beroza et al. | |
| 2013/0204581 | A1 * | 8/2013 | Park | A01M 1/2016 43/112 |
| 2014/0246545 | A1 | 9/2014 | Markov | |
| 2014/0303814 | A1 | 10/2014 | Burema et al. | |
| 2015/0041593 | A1 | 2/2015 | Markov | |
| 2017/0249512 | A1 | 8/2017 | McClatchie et al. | |
| 2017/0287082 | A1 * | 10/2017 | Karube | G06Q 50/02 |
| 2019/0037828 | A1 | 2/2019 | Bennett | |
| 2019/0082650 | A1 | 3/2019 | Lepek et al. | |
| 2019/0141947 | A1 * | 5/2019 | Zha | A01K 67/033 43/1 |

FOREIGN PATENT DOCUMENTS

| | | |
|---|---|---|
| WO | WO 2012/054397 | 4/2012 |
| WO | WO 2014/037936 | 3/2014 |
| WO | WO 2016/046823 | 3/2016 |
| WO | WO 2016/088127 | 6/2016 |
| WO | WO 2017/154003 | 9/2017 |

OTHER PUBLICATIONS

Ex Parte Quayle Official Action dated Aug. 31, 2020 from the US Patent and Trademark Office Re. U.S. Appl. No. 16/082,306. (13 pages).

International Preliminary Report on Patentability dated Jul. 5, 2018 From the International Preliminary Examining Authority Re. Application No. PCT/IL2017/050303. (15 Pages).

International Search Report and the Written Opinion dated May 10, 2017 From the International Searching Authority Re. Application No. PCT/IL2017/050303. (16 Pages).

Written Opinion dated Mar. 13, 2018 From the International Preliminary Examining Authority Re. Application No. PCT/IL2017/050303. (7 Pages).

Anaman et al. "Benefit-Cost Analysis of the Use of Sterile Insect Technique to Eradicate Screwworm Fly in the Event of an Invasion of Australia", Preventive Veterinary Medicine, XP023844286, 20(1-2): 79-98, Jul. 1, 1994. Fig.2, p. 87, Lines 5-19.

Caragata et al. "Exploiting Intimate Relationships: Controlling Mosquito-Transmitted Disease With Wolbachia", Trends in Parasitology, XP029437617, 32(3): 207-218, Published Online Nov. 20, 2015. p. 216, Top Para 'Given This Variability . . . '.

Hopkins "Developing the Sterile Insect Technique for Eradication of Incursions of Mediterranean Fruit Fly in Australia", Horticulture Australia Ltd., Project AH 01025, Final Report, p. 1-46, Sep. 2004.

Lees et al. "Back to the Future: The Sterile Insect Technique Aganst Mosquito Disease Vectors", Current Opinion in Insect Science, XP055367116, 10: 156-166, Available Online Jun. 3, 2015. p. 158, 'Progress in SIT Field Application', 3rd Para.

Manoukis et al. "A Computer Model of Insect Traps in a Landscape", Scientific Reports, 4(7015): 1-8, Nov. 12, 2014.

Examination Report Under Sections 12 & 13 of the Patents Act, 1970 and the Patents Rules, 2003 dated Dec. 9, 2020 From the Government of India, Intellectual Property India, Patents, Designs, Trade Marks, Geographical Indications, The Patent Office Re. Application No. 201817036375. (6 Pages).

* cited by examiner

Trap A number of mosquitoes similar to trap B

Trap A number of mosquitoes >> trap B, so the release pattern suggests releasing at higher frequency at the area near Trap A

MISSION PLANNER FOR THE AERIAL RELEASE OF MOSQUITOES

RELATED APPLICATIONS

This application is a divisional of U.S. patent application Ser. No. 16/082,306 filed on Sep. 5, 2018, which is a National Phase of PCT Patent Application No. PCT/IL2017/050303 having International Filing Date of Mar. 9, 2017, which claims the benefit of priority under 35 USC § 119(e) of U.S. Provisional Patent Application No. 62/306,224 filed on Mar. 10, 2016. The contents of the above applications are all incorporated by reference as if fully set forth herein in their entirety.

FIELD AND BACKGROUND OF THE INVENTION

The present invention, in some embodiments thereof, relates to mission planning for aerial release of insects and, more particularly, but not exclusively, to release of sterile male mosquitoes.

Today there are large regions in the Americas, Africa and Asia that are highly susceptible to vector-born diseases transferred by mosquitoes, such as Dengue, Malaria, Chikungunya and others. These are infectious disease carried and spread by a bite from a female mosquito. There may be other diseases which are also spread by other insects.

One method of dealing with the mosquito problem involves producing modified laboratory produced mosquitoes and releasing them into the wild. The laboratory produced mosquitoes are provided with characteristics that help fight the spread of the disease. For example they may be sterile male mosquitoes, say as a result of being treated by radiation at some point in their life cycle. Female mosquitoes tend to mate only once, so an environment of sterile males can dramatically reduce the population. Another possibility is to provide genetically modified male mosquitoes. The genetic modification is to ensure that when mating with a wild female, no adult mosquito successfully grows.

Mosquitoes are fragile insects, and a problem arises when trying to store, transport and release the modified male adults in the very large numbers and over very large areas that are needed to make a significant difference to the wild population.

Research continues to explore methods for mass rearing of the lab mosquitoes, and current distribution methods are mostly manual, and limited in the numbers of mosquitoes that can be delivered and the terrain they can be delivered to. Aerial delivery of mosquitoes is known, but even so, due to the difficulties of rearing and handling the fragile insects, the laboratory grown sterile males remain a limited resource that needs to be carefully allocated for maximum effect.

Today, in general, an aircraft traverses an area where the resource is to be released. However mosquito populations do not cover uniform areas but rather tend to exist in hotspots, particularly around stagnant water. Thus the majority of mosquitoes released are likely not to meet up with the wild mosquito populations. Even with knowledge of the ground distribution of the mosquitoes, aerial release involves a considerable amount of drift, meaning that even if release is over particular ground locations, some of the resource will be wasted.

SUMMARY OF THE INVENTION

The present embodiments relate to planning and executing aerial release of insects in a way that makes most effective use of time and resources. In particular insect populations, which are unevenly distributed on the ground can be duly serviced with suitable planning. Furthermore weather conditions such as wind speed can be taken into account to provide efficient distribution.

The ground distribution of the population is surveyed. The survey information is provided in machine-readable format, say as a density distribution on a map. And then resources are allocated in accordance with the distribution. The population density may be translated into an aerial release map.

According to an aspect of some embodiments of the present invention there is provided a system for distribution of insects over a geographical area, comprising:

a distribution mapping unit configured to use available population density data of a wild insect population to generate a distribution map showing said population density at a desired resolution level;

a release mapping unit configured to apply distribution parameters, the distribution parameters describing effects of distribution on actual insects, to the distribution map to form a release map; and at least one distribution vehicle, the vehicle having a characteristic distribution resolution and an influence on said distribution parameters, such that said resolution level and said distribution parameters are modified for said at least one distribution vehicle; the system configured to define a release path to be followed by said distribution vehicle and release dosages of insects to be released along said distribution path, said release dosages being defined at said resolution level modified for said at least one distribution vehicle.

An embodiment may comprise a ground based data gathering unit configured to obtain population density data of a wild insect population around said geographical area.

In an embodiment, said ground based data gathering unit comprises an arrangement of traps over said geographic area and an interpolation unit configured to use measurements taken from said traps to assign population density numbers to cells at said resolution level.

In an embodiment, said interpolation unit is configured to assign to each cell a number based on insect captures at neighboring traps, the captures at each trap being inversely weighted for distance of the respective trap.

In an embodiment, said interpolation unit is configured to assign to each cell a number being an average between each trap within the cell.

In an embodiment the cells are equal area release cells.

In an embodiment, the at least one distribution vehicle is a ground vehicle, and the release map is modified according to the release resolution and the distribution parameters of said ground vehicle.

In an embodiment, the at least one distribution vehicle is a piloted aircraft, and the release map is modified according to the release resolution and the distribution parameters of said piloted aircraft.

In an embodiment, the at least one distribution vehicle is a pilotless drone, and the release map is modified according to the release resolution and the distribution parameters of said pilotless drone.

In an embodiment, the at least one distribution vehicle is an aerial craft with the ability to hover over a defined location, and wherein the release map is modified according to the release resolution and the distribution parameters of said aerial vehicle.

In an embodiment, the insects to be released are sterile males.

In an embodiment, the insects to be released are mosquitoes.

An embodiment may comprise an update unit configured to obtain additional data about said wild population following distribution and provide an updated distribution plan.

The updated plan may be obtained based on additional ground measurements, or on a model of how the insects have been distributed.

According to a second aspect of the present invention there is provided a method of preparing a distribution program for insects comprising:

- obtaining distribution data of a wild population of insects;
- obtaining distribution parameters including distribution resolution levels of at least one available distribution vehicle;
- generating a population density map at a resolution level consistent with said distribution resolution level of said at least one available vehicle;
- generating a release map by modifying said population density map in accordance with said distribution parameters; and
- generating a path using said release map, the path defining dosages of insects to be released at respective locations along said path.

In an embodiment, said at least one vehicle comprises a plurality of vehicles, each having respective distribution parameters and distribution resolution levels, said path containing part paths for each of said respective vehicles, each part path based on a release map obtained using respective distribution parameters and each part path defining said dosages according to a respective distribution resolution level.

In an embodiment, said distribution parameters for a respective vehicle comprise at least one member of the group consisting of:

- parameters arising from the motion of the vehicle during distribution;
- parameters arising from a mechanical effect on the insects of a distribution mechanism being used;
- parameters arising from local weather in the area of the distribution; and
- parameters arising from flying activity of the insects being distributed.

The method may comprise defining one or more release points based on GPS coordinates of a ground-based population monitoring trap, and then at each release point basing a number of insects to be released on captures at the corresponding ground-based monitoring trap, so that the insect release matches the identified population.

In an embodiment, two or more vehicles are used, and each vehicle is assigned a part of the path. The parts of the path may be distributed between the various vehicles according to a cost function so that each vehicle shares in the various cost features.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
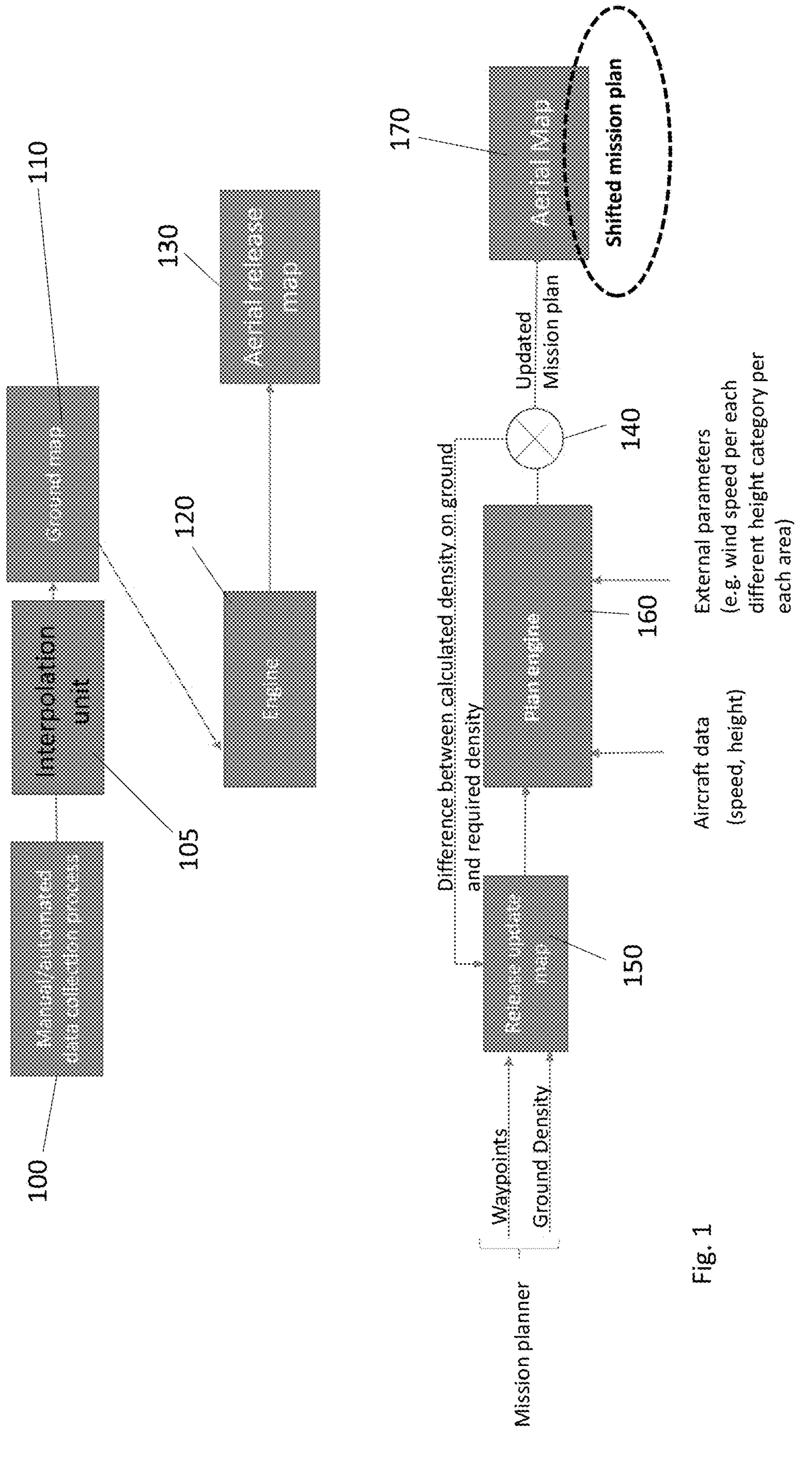
FIG. 1 is a simplified chart illustrating how data collection on a wild insect population can be transformed into an aerial release map according to embodiments of the present invention.

The present embodiments relate to planning and executing release of insects in a way that makes most effective use of time and resources. The release may aerial or on the ground.

Traps are used to map a population distribution including density. A population density map is then constructed of the particular insect population in question.

The insect population in question may be considered as a whole.

The ground map of population density may then be translated into an aerial release map to indicate where manned or drone aircraft may most effectively release the insects. The aerial release map may be electronically updated, say with current wind speeds, to estimate drift.

Finally resources are allocated on the basis of the aerial release map.

In the case of good weather and low aerial release heights, the aerial release map could be dispensed with, so that allocation of resources is carried out directly on the basis of the ground density map.

Embodiments may provide building a release map over a region which shows different densities per each of a plurality of area units into which the region is divided, where the density data is based on a series of traps set out across the region.

Data is integrated from the various sources such as ground traps. As well as traps, densities of local infection rates from medical services may also be used.

Mission planning may provide the ability to foresee the progress of the mosquitoes and thus suggest where to spray next. That is to say the maps may include dynamic information about the movement of the insects. Regularly updated maps may show that the insects are moving in a particular direction and this can be taken into account when spraying.

Thus a smart engine may be used to dynamically update the map and show how the distribution progresses over time. The smart engine may translate the ground density into an aerial release map, by calculating:

Effects due to the manner of release—say aircraft speed, performance of the distribution nozzle or pod.

Once away from the aircraft what is their trajectory as free-falling objects with or without taking local wind speeds into account.

Randomness representing the possibility that the insects actually fly around before reaching the ground, or that the insects encounter wind behavior not known to the engine.

Before explaining at least one embodiment of the invention in detail, it is to be understood that the invention is not necessarily limited in its application to the details of construction and the arrangement of the components and/or methods set forth in the following description and/or illustrated in the drawings and/or the Examples.

The invention is capable of other embodiments or of being practiced or carried out in various ways.

Referring to FIG. 1, a manual or automated data collection process 100 gives rise to a ground map 110. Given that the resource (infertile male mosquito) is scarce, the quantity of mosquitoes to be released may be correlated with the actual number of the wild mosquitoes on ground. In order to carry out such correlation, the locations of mosquitoes and their density at specific points may be identified, and then the density information may be translated into a coherent mission plan.

The density information is preferably made as comprehensive as possible since sporadic locations of mosquitoes may not provide enough information for a suitable flight plan.

Moreover, the data pertaining to the location of mosquitoes may come from different data resources and not only mosquito traps, for example note may be taken of areas with higher infection ratios in the population etc. Also, the motivation or the reasoning as to where to locate a trap may not generally be the same policy as how to build a flight path. Perhaps for example, a specific trap is located in an area, above which the aircraft cannot fly.

Also given that a region of interest may be large, it may not be economical to cover the entire area with mosquito traps, with small spacing of 50-200 meters (the distance some species of mosquitoes may fly).

Given the results from the traps themselves, it is still a question as to what the release path is, what the dosage along the path is, and what to do between the traps etc.

Also, the drift of the mosquitoes after release, a combination of the mechanics of the actual release system and external parameters such as winds, may be taken into account. In this event the release is not based directly on the ground distribution of the insects. Thus the ground map 110 may be processed by engine 120 to provide aerial release map 130. As discussed above, the aerial release map may involve calculating distribution factors to do with the aircraft, with the local weather and with the natural tendency to scatter of the insects themselves.

Once it is known how many mosquitoes are required and where they are needed, then the release may be managed as a single entity.

Issues that may be considered include ranges of aircraft. For example, if using a UAV or a quadcopter to release the insects, issues such as maximum flight distance should be taken into consideration, as well as the capacity of the craft to carry enough insects for the area in question.

The mission may subsequently be updated. Densities of insects may be measured again from the traps. In this case specific densities of male insects may be of interest to show where the sterile males sufficiently outnumber the wild males. The new densities may be compared by comparator 140 with the existing densities to provide updated distribution map 150 and then engine 160 may calculate a new aerial map 170. As an alternative, without checking, the update may be a model of how many of the insects reach the ground.

A system for distribution of insects over a geographical area, may thus involve a distribution mapping unit which uses available population density data of a wild insect population and generates a distribution map showing the population density at any desired resolution level, typically that of the most high resolution distribution vehicle available. A release mapping unit then applies distribution parameters, the distribution parameters describing effects of distribution on actual insects, to the distribution map to form a release map, as will be described in greater detail with respect to FIG. 15 below. The distribution vehicle or vehicles used have a characteristic distribution resolution. Thus a fast moving aircraft able to change the dosage once every two seconds will have one distribution resolution whereas a land vehicle may have a much higher distribution resolution. Likewise other distribution parameters such as forward motion of the vehicle, actual distribution equipment used, nozzle, pod, hose etc, and local wind speed and like parameters can also affect distribution.

The distribution parameters and resolution are used to modify the maps and generate a release path and a distribution plan that manages the available vehicles and the insects to distribute the insects in the most efficient manner possible. The distribution path is a flight or drive path that indicates what dosage of insects is to be delivered at the different locations along the flight path.

A ground based data gathering unit obtains population density data of a wild insect population around the geographical area, say using traps. An interpolation unit, 105, may use measurements taken from the traps to assign population density numbers to cells at the resolution level.

The interpolation unit 105 may assign to each cell a number based on insect captures at neighboring traps, the captures at each trap being inversely weighted for distance of the respective trap, as discussed in greater detail hereinbelow.

Alternatively, the interpolation unit 105 may assign to each cell a number being an average between each trap within the cell.

The cells may be equal area release cells.

The distribution vehicle may be a ground vehicle, in which case the release map is modified according to the release resolution and the distribution parameters of the ground vehicle.

Alternatively the distribution vehicle may be a piloted aircraft, with the release map being modified according to the release resolution and the distribution parameters of the piloted aircraft.

Alternatively, the at least one distribution vehicle may be a pilotless drone, and the release map is modified according to the release resolution and the distribution parameters of the pilotless drone.

The at least one distribution vehicle may be an aerial craft with the ability to hover over a defined location, such as a helicopter or a quadcopter or the like. Again the distribution map is modified accordingly.

In some cases there may be a variety of different vehicles available. Parts of the distribution are assigned to different vehicles and the release map is constructed differently for each part of the distribution.

In a typical case the insects to be released are sterile males, typically mosquitoes, and are released to control the wild mosquito population in the face of insect-born infections such as malaria or zika.

An update unit may obtain additional data about the wild population following distribution and provide an updated distribution plan.

A method of preparing a distribution program for insects using the system of FIG. 1 thus involves obtaining distribution data of a wild population of insects such as the wild mosquito population. Distribution parameters including distribution resolution levels of one or more available distribution vehicle are obtained. A population density map is obtained at the resolution level consistent with the available vehicle, and then a release map is generated by modifying the population density map in accordance with the distribution parameters. From the release map a path is defined which includes dosages of insects at the various locations along the path.

As discussed, there may be multiple vehicles and each part of the release map and path is calculated according to the abilities of the vehicle assigned.

The distribution parameters for a respective vehicle may include parameters arising from the motion of the vehicle during distribution, parameters arising from a mechanical effect on the insects of a distribution mechanism being used, parameters arising from local weather in the area of the distribution, and parameters arising from flying activity of the insects being distributed.

Figure 2:
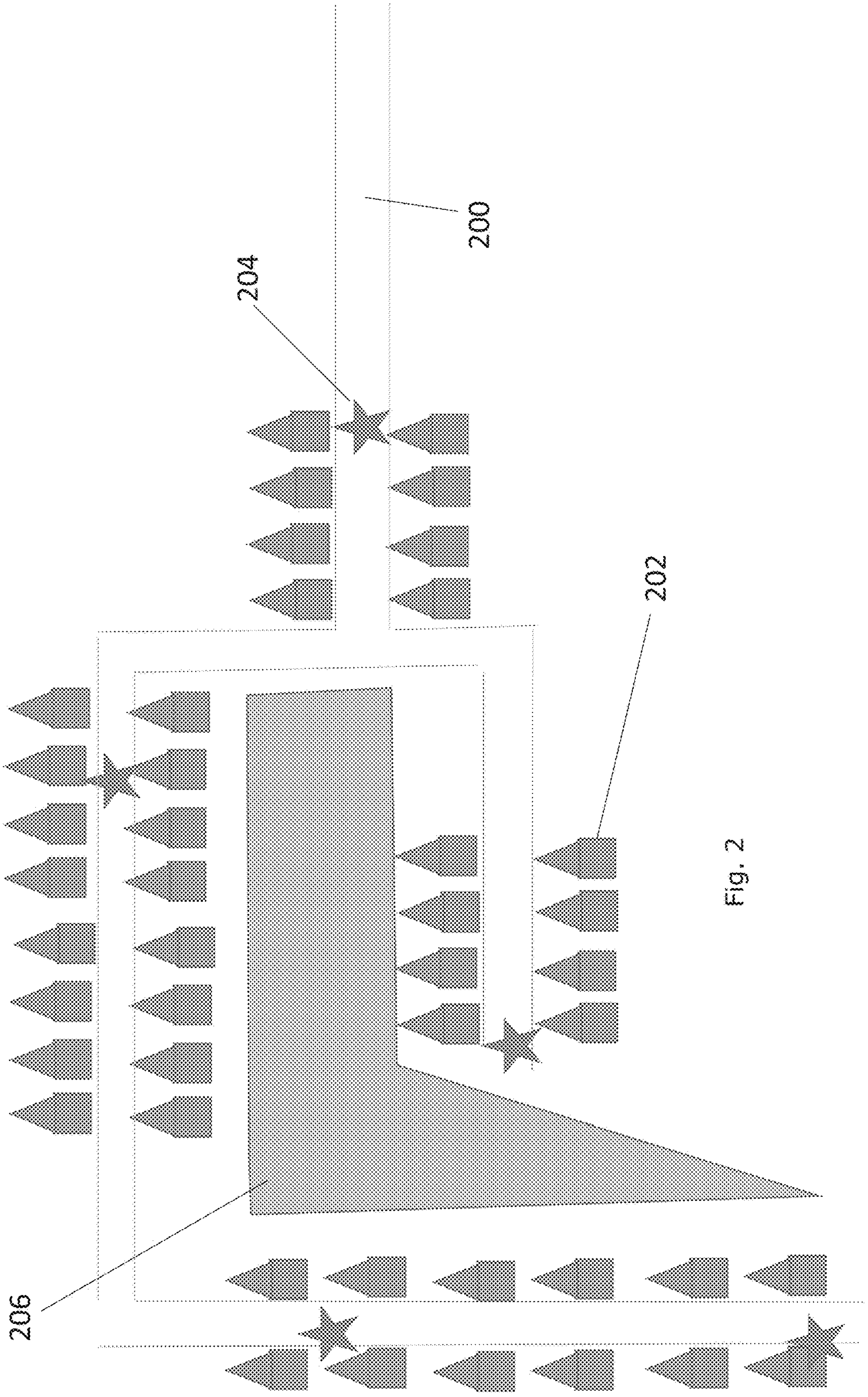
FIG. 2 is a simplified diagram illustrating a street plan with traps for sampling insects.

Reference is now made to FIG. 2, which illustrates a street plan with streets 200 and houses 202. Traps are placed at the locations indicated by stars 204. Region 206 is a region where no sterile insects are to be released.

Figure 4:
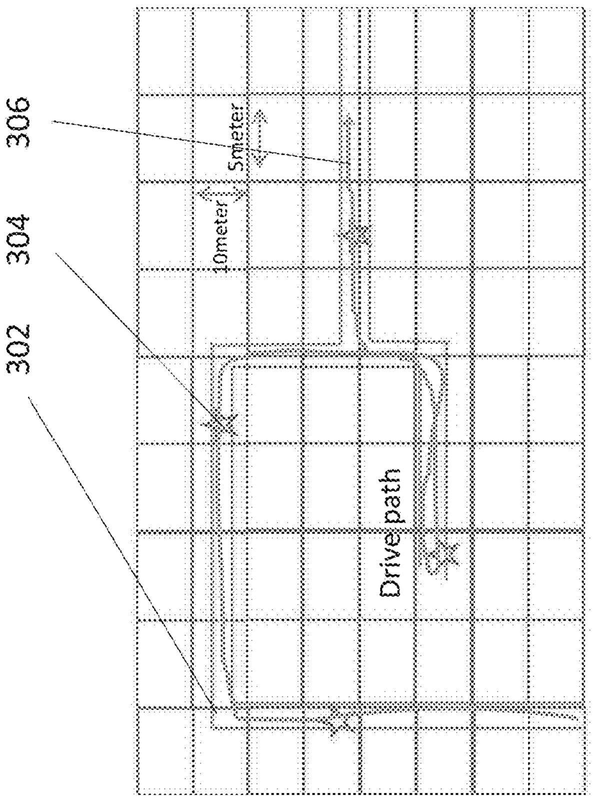
FIG. 4 is a simplified diagram illustrating a drive path for a land vehicle generated based on the traps of FIG. 2 according to embodiments of the present invention.
Figure 3:
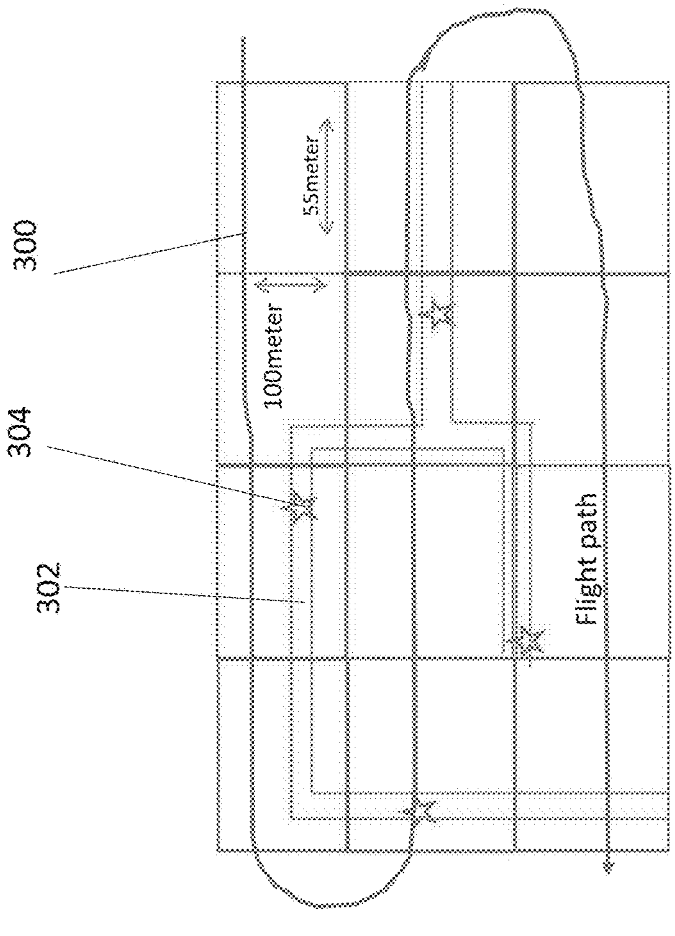
FIG. 3 is a simplified diagram illustrating a flight path generated based on the traps of FIG. 2 according to embodiments of the present invention.

Reference is now made to FIGS. 3 and 4, which show the street plan of FIG. 2 with varying sizes of a release cell superimposed on the plan. FIG. 3 shows a release path 300 for a piloted aircraft moving at 200 kmh, over streets 302 and based on data from traps 304. The cell size is 55 meters by 100 meters.

FIG. 4 shows a release path 306 for a ground-based vehicle moving at 20 kmh along a release path that follows streets 302, and uses data from traps 304. The cell size is 5 m by 10 m.

The cells creating the grid are the smallest size of area which can be covered by the release system while still being able to change the dosage between adjacent cells. Thus the cell size may be set by the release equipment used. A piloted aircraft flies at a minimum of around 140 kmh thus necessitating a larger cell size than a quadcopter which can hover stationary over the target to carry out a precision release at low height.

For an aircraft unable to hover, however, the time it takes to change the release rate limits the resolution of the system and thus the cell size. For example, if a particular aerial release system can change the dosage every second, then during a duration of one second it may release at a rate of 1,000 mosquitoes per second, and for the next second's duration the release system may release 2,000 mosquitoes per second. Now if the vehicle is flying at 50 meters per second, then the smallest possible cell length in which it is actually possible to change the release rate in between cells is 50 meters.

The swath (or the Y axis) is given by the dispersion of the mosquitoes perpendicular to the propagation path. For an airplane it can be for example 100 meter, while for a ground vehicle it can be 10 m.

It is possible to make the cell size smaller than the practical resolution level of the system, and this may happen if the distribution plan is made for one kind of release aircraft but the distribution is carried out by a different aircraft. In other circumstances the cell size can be larger, for reasons which will be discussed hereinbelow.

The cell boundaries may be defined using GPS coordinates, so that when the vehicle (ground or aerial) enters into the next cell the vehicle may determine from the GPS resolution that the next cell has been entered.

Figure 5:
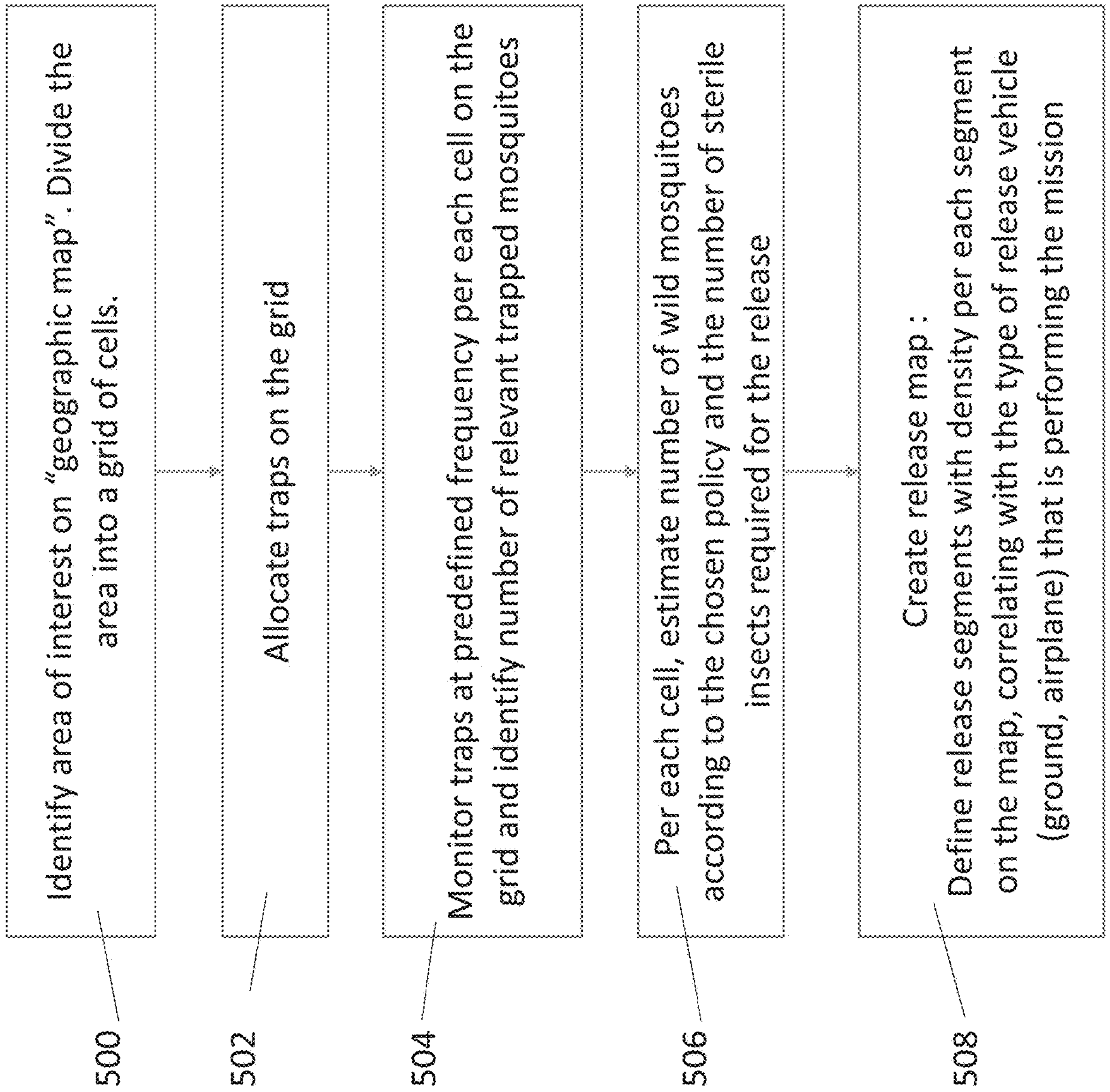
FIG. 5 is a simplified flow chart illustrating stages in generating a release map at a desired cell resolution.

Reference is now made to FIG. 5, which is a simplified flow diagram showing how the traps may be used to determine insect population densities and determine how many insects are to be released in a given area that is on a given grid. The area is identified and is divided into a number of grid cells based on the abilities of the distribution vehicle—500. Traps are allocated over the grid to give the best coverage that is practical for the geographical area 502. The traps are monitored at regular intervals 504. The interval may be a preset frequency if practical. If traps with electronic monitoring are available than real time monitoring may be provided.

The numbers of trapped insects provide a population sample, but what is needed is an estimate of the wild population in the area, which will always be larger than the sample—506. That is to say, while traps may give relative densities of the population, a more thorough analysis at one particular location may allow for a translation factor to get from the trap to an estimate of the actual population density, or existing data may be available or experience of local scientists or the like. Also the trap distribution is not the same as the grid distribution however this may be solved by extrapolation.

Having obtained the numbers from the traps, the trap numbers are translated into estimates of numbers of wild mosquitoes per grid square, so that the numbers of insects to be released can be determined. For example the number of wild mosquitoes per unit area found in the traps could be multiplied by 10 to give the number of the sterile mosquitoes to be released in that grid square.

A ratio of 1:10 is recommended by "Successful suppression of field mosquito population by sustained release of engineered male mosquitoes", Angela F Harris and more, Nature Biotechnology, 10 Sep. 2012. Other ratios may be applicable.

Without knowing an exact number, the default should be above 4,000 per hectare (according to "Mosquito handling, transport and release methods", Report of a Consultants Group Meeting held in Vienna, Austria, 8-12 December 2014).

Also "there is unfortunately no consensus as to what the most appropriate methodology is for population size estimation"—from "Estimation of *Aedes aegypti* (Diptera: Culicidae) population size and adult male survival in an urban area in Panama", Marco Neira and others, Mem Inst Oswaldo Cruz, Rio de Janeiro: 1-8, 2014.

For the purpose of the present embodiments it will be apparent that different policies may apply when extrapolating the number of actual wild mosquitoes from the trap results, but that there is such a factor, and different factors may apply in different circumstances.

Depending on the capability of the release device or release vehicle, the release rate is calculated as per a required number of mosquitoes per unit of time (e.g., seconds), or required number of mosquitoes per unit area (e.g., hectare or acre).

Hence a release method may enable a dosage release—and a release map may require different dosage at different places—508.

Travelling with a vehicle at 10 km/hr, while releasing some 1,000 sterile mosquitoes every 1-2 minutes is one possibility, and using an aircraft and releasing 6,000 mosquitoes per second, and 5 minutes later releasing 2,000 mosquitoes per second, while travelling at 250 km/hr is much more efficient and can reach places that the vehicle cannot reach.

Thus estimating the density may involve extrapolating the actual release dosage required per hectare and/or per release point from sporadic traps.

Understanding that the traps provide only local information specifically where they are located, and this information may actually not be at the position our release vehicle is driving or our release aircraft is flying, then it becomes necessary to estimate densities within the area of interest, which are at different locations, after which the densities may be translated into the release map. There may be different policies as per how to make the estimate and the translation, and the only case some form of translation may not be required, would be if the release were exactly above the traps which were provided as one per grid unit, generally considered impractical.

Figure 6:
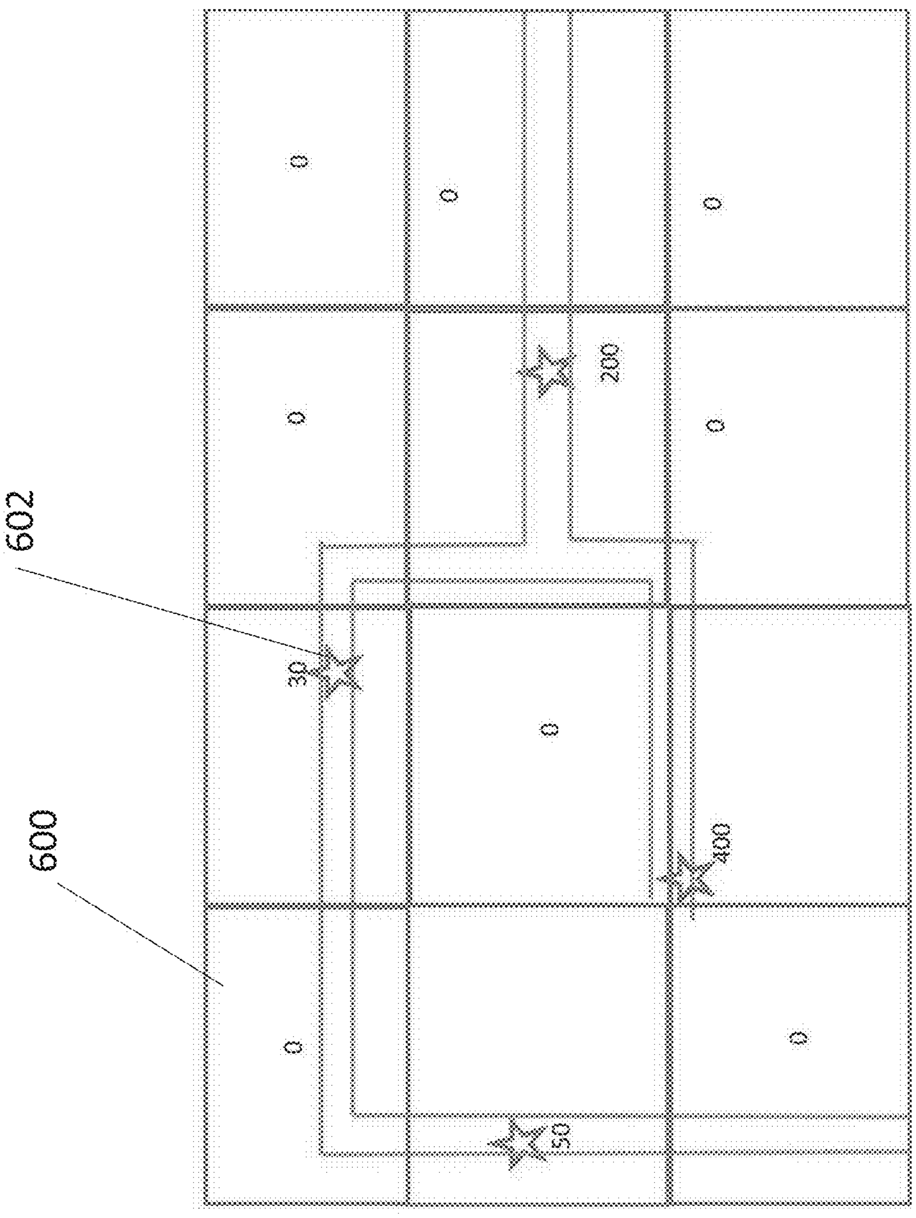
FIG. 6 is a simplified diagram showing the street plan of FIG. 2 divided into evenly shaped cells according to embodiments of the present invention.
Figure 7:
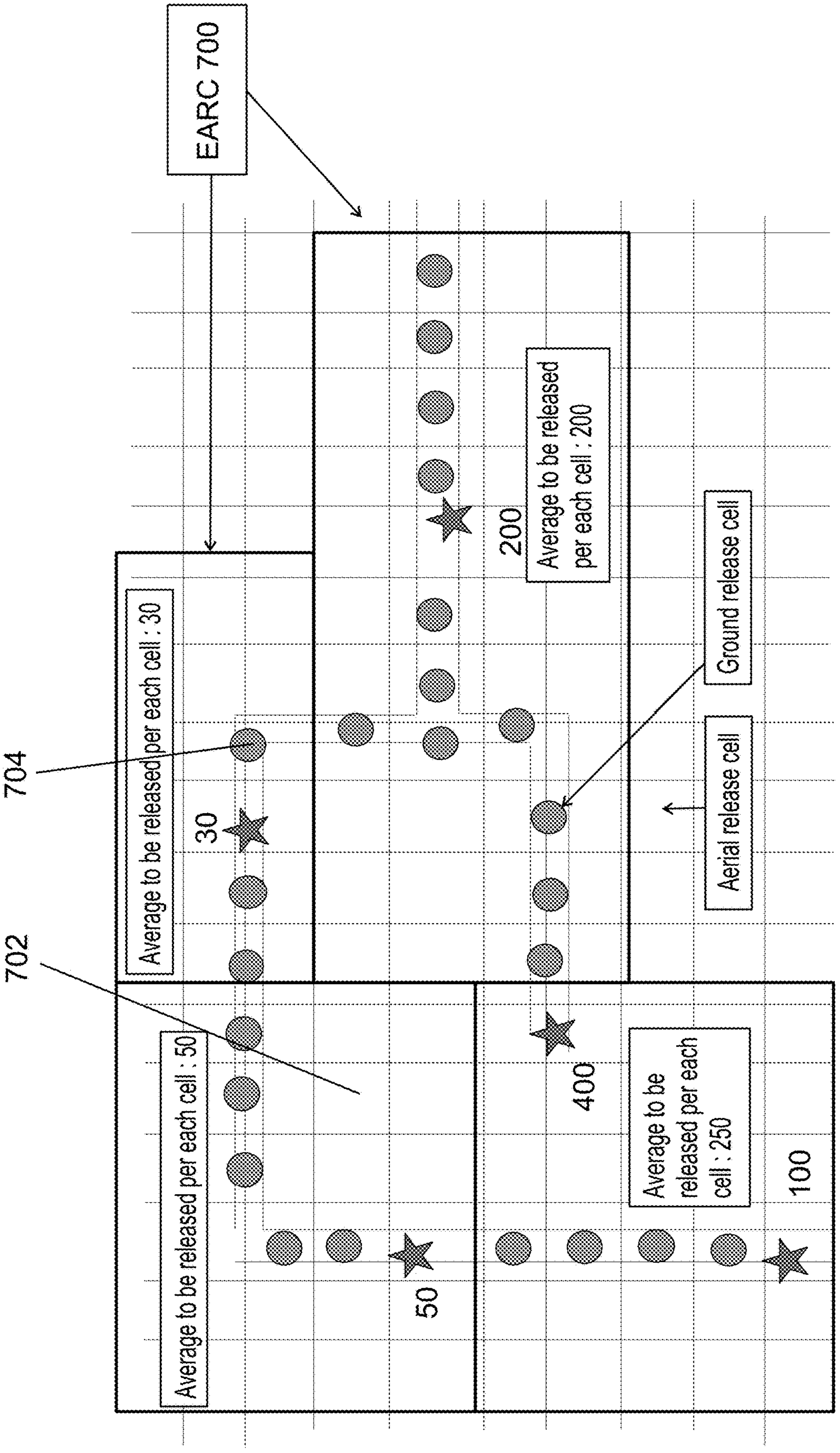
FIG. 7 is a simplified diagram illustrating use of a first policy for assigning densities to cells according to embodiments of the present invention.

Reference is now made to FIGS. 6 and 7 which show two possible policies to identify the density per cell on the grid.

FIG. 6 shows a grid of cells 600 over the road plan discussed above. Traps 602 provide numbers of captured insects. FIG. 6 illustrates a policy for assigning numbers to the cell that states that if there is no trap in the cell 600 then the density is zero. If there is a single trap, then the value is of that trap. If there is more then one trap, the value is the average of the values per all of the traps in that cell.

As illustrated, there is at most one trap per cell. Cells having a trap are assigned the number of the trap. Cells lacking a trap are assigned zero.

FIG. 7 illustrates an alternative policy involving grouping of cells into Equal Area Release Cells (EARC) 700.

The overall area is divided into EARC's 700, whose size may range from two cells up to the entire area as a single unit with equal release volumes.

Then all traps results are averaged, already factoring for wild and sterile numbers, per each EARC.

The average for the EARC is then set as the value of each cell within the EARC.

If there is no trap inside a specific EARC then there are two options. One option is to set the value to zero, and another option is to increase the EARC in some direction/s until it has at least one trap inside it. The grid makes up cells for aerial release 702, and circles 704 are the cells for ground release.

As illustrated each EARC has a single trap therein and the value measured at that trap is used for all the cells in the EARC.

Figure 8:
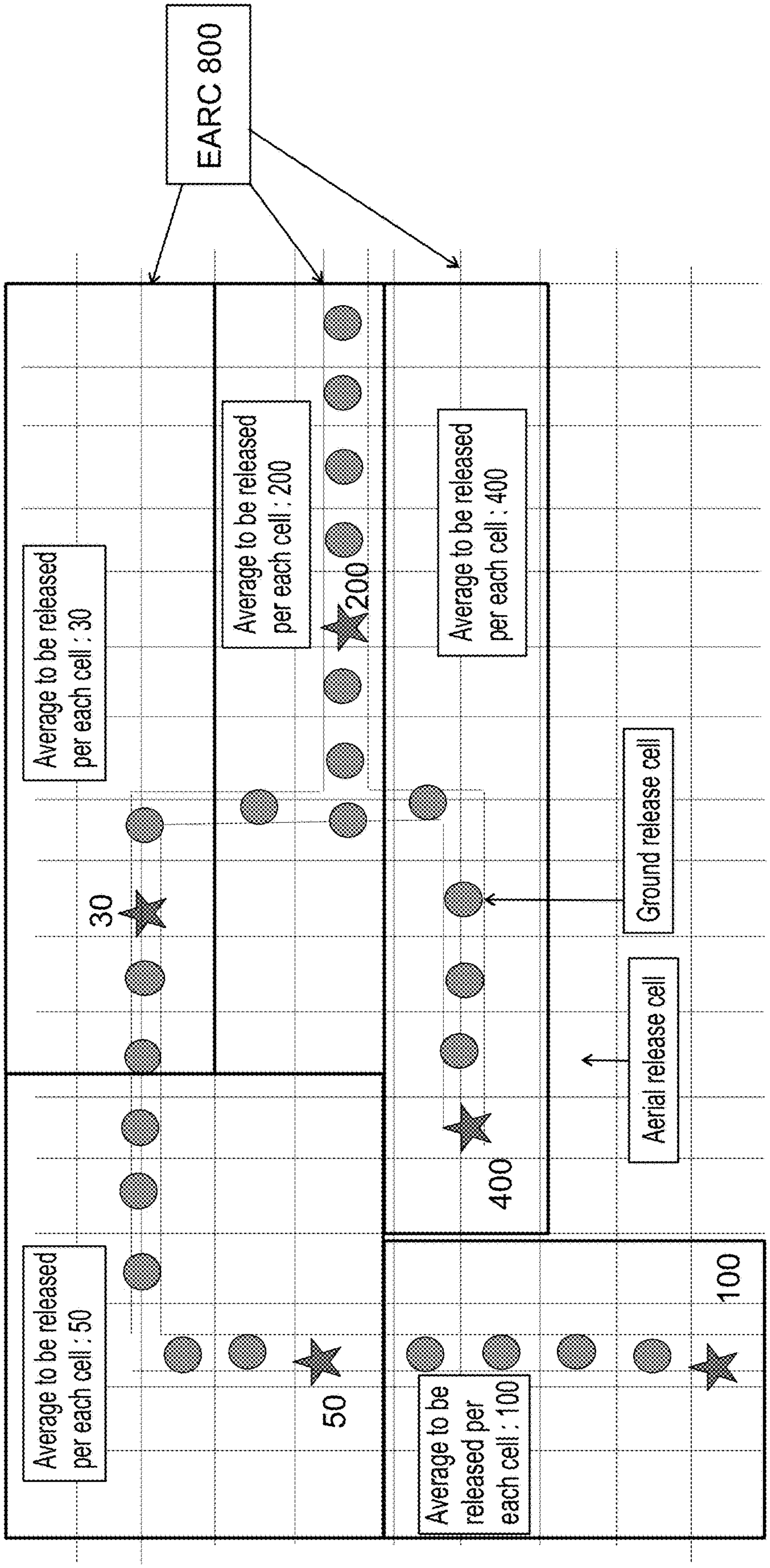
FIG. 8 is a simplified diagram illustrating use of a second policy for assigning densities to cells according to embodiments of the present invention.

Reference is now made to FIG. 8, which shows another example in which EARCs 800 are of different size. Again the cell densities are obtained by equating the number of mosquitoes per each EARC, either by averaging over all the traps in the cell if more than one, or setting to the value of the single trap in the EARC. If there are no traps in the EARC then the two options above may be resorted to. For simplicity, the ratio for this drawing between wild and sterile are 1:1.

Figure 9:
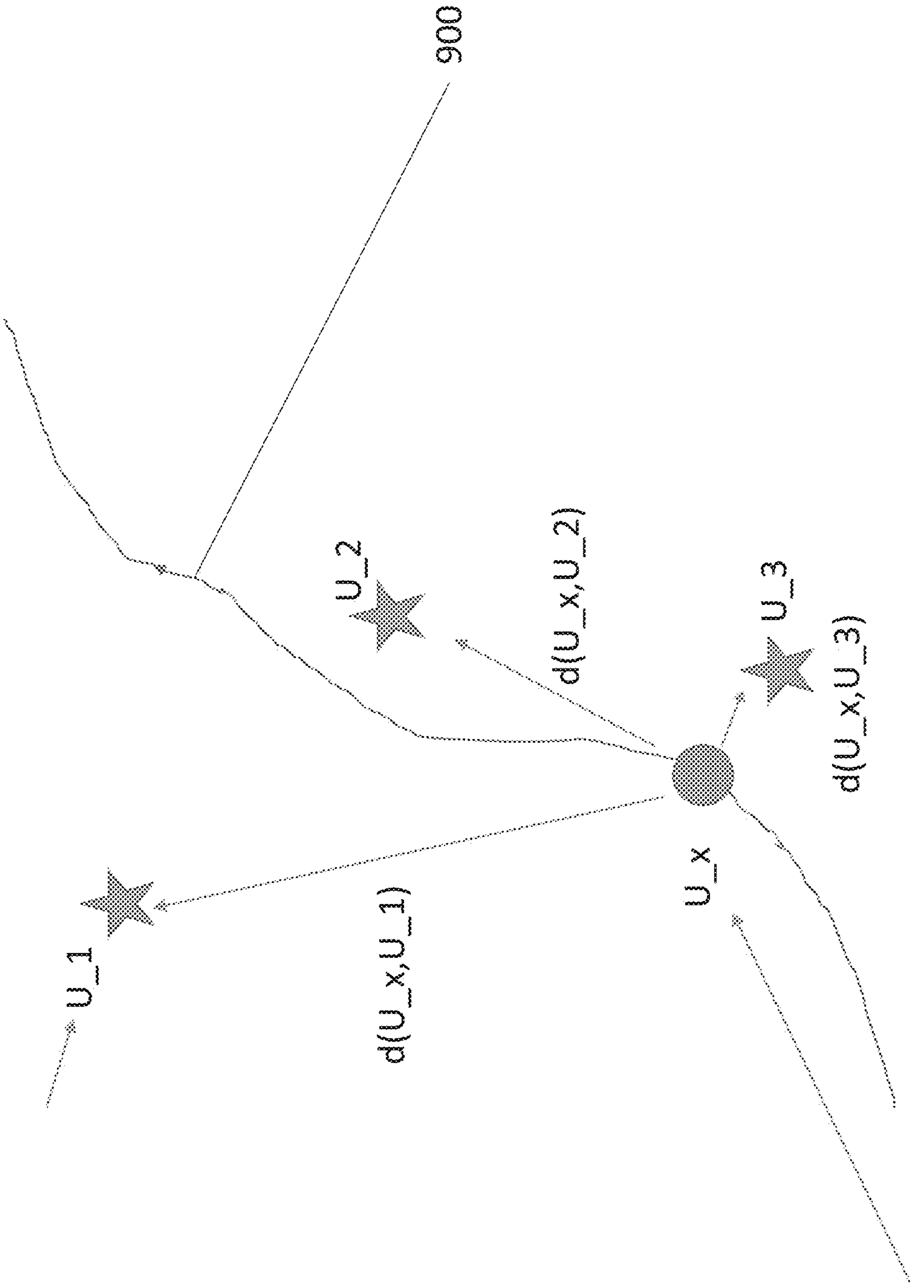
FIG. 9 is a simplified diagram illustrating use of weighting algorithm for assigning densities to individual release points according to embodiments of the present invention.

Reference is now made to FIG. 9 which is a simplified diagram illustrating another policy—Inverse Distance Weighting or hereinafter IDW.

IDW addresses scattered traps, and a way in which estimate the values in places without traps. A vehicle moves along path 900 and requires to know how many mosquitoes (Ux) to release at a point x based on traps U1, U2 and U3.

Given U_i (i=1 . . . 3): Number of mosquitoes for trap i d(U_x,U_i): Distance between point U_x and trap u_i The moving vehicle (vehicle, UAV, airplane, etc.) estimating at time t_i an Inverse Weighted Average of the traps within the defined area.

This is because a trap's chances of luring mosquitoes monotonically decreases as a function of the distance. That is to say it may be the reciprocal of the distance 1/r, if p=1, or any other decreasing function of distance $1/r^2$ for p=2, etc.

The next step is that having estimated the number of mosquitoes along the vehicle path, then the actual number of mosquitoes to be released may be identified. One way of doing this is to multiply by a known parameter (usually a factor such as 4 or 10, as discussed above) and decide on the quantities to be released at every cell the vehicle (or airplane) moves through.

In greater detail, as there are N scattered points in space, each representing data about numbers of wild mosquitoes at that point, coming from, for example, a mosquito trap at that point, then for every point u, the interpolated point, in release path 900, we want to estimate the number of mosquitoes to be released at that point.

u may be a single point per each cell, so that each cell has only one value as per the estimation for the wild population and for the required number of sterile males to be released.

Reflecting the decreasing effect of the trap, meaning its ability to trap and lure mosquitoes, as the distance increases from the interpolated point, greater values of P (formula below) assign greater influence to values closest to the interpolated point. Different functions may be applied to represent a monotonic deceasing function of the distance from the traps and here we suggest a particular function.

$$i = 1, 2, \ldots, N$$

$$u(x) = \begin{cases} \dfrac{\sum_{i=1}^{N} w_i(x) u_i}{\sum_{i=1}^{N} w_i(x)}, & \text{if } d(x, x_i) \neq 0 \text{ for all } i \\ u_i, & \text{if } d(x, x_i) = 0 \text{ for some } i \end{cases}$$

$$w_i(x) = \frac{1}{d(x, x_i)^p}$$

Figure 10:
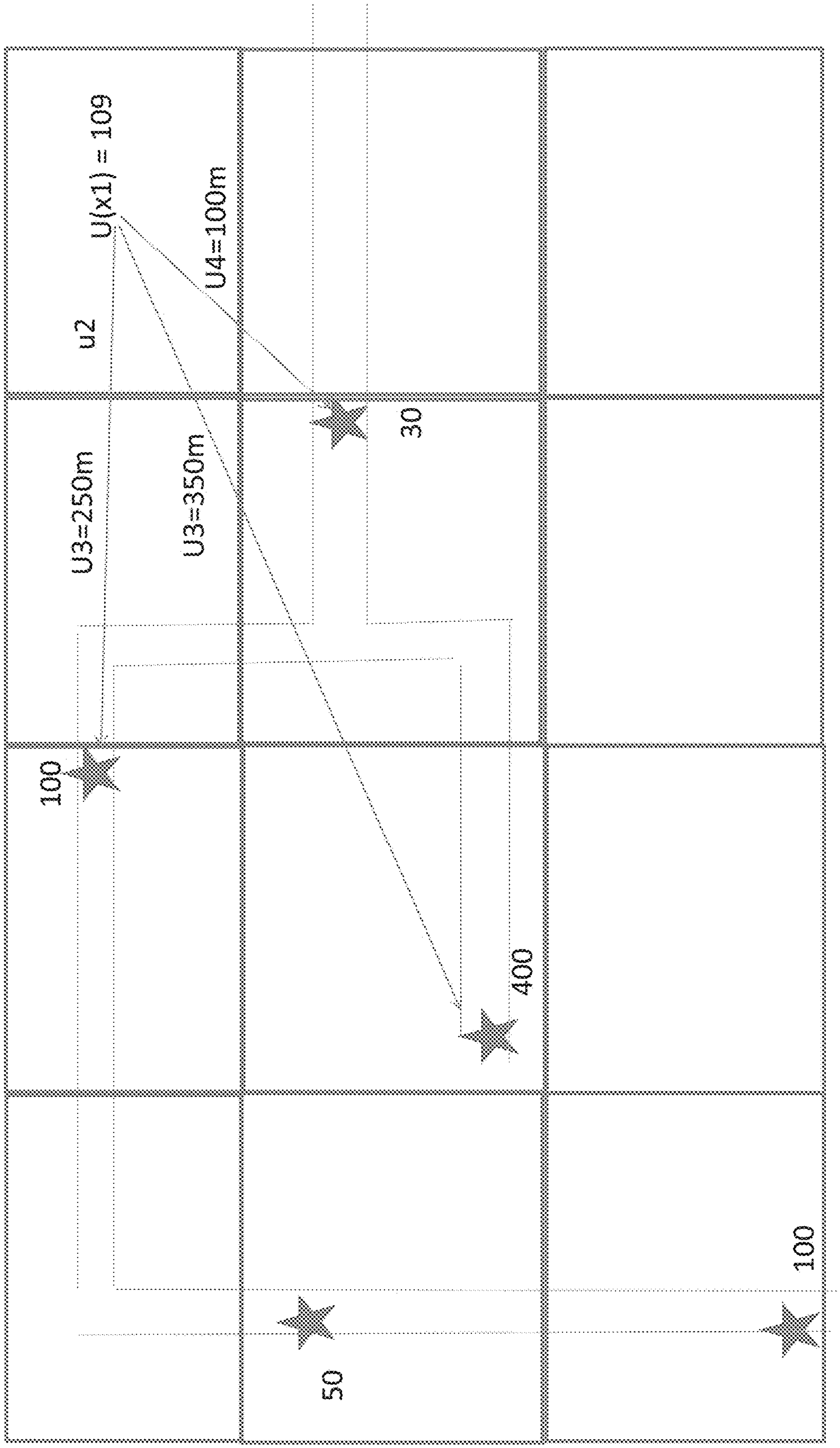
FIG. 10 illustrates a first way of using the weighting algorithm of FIG. 9 for assigning population density values to cells.

U_i (i=1 . . . 3): Number of mosquitoes for trap i d(U_x,U_i): Distance between point U_x (on our release path for example) and trap u_i Reference is now made to FIG. 10 which illustrates how the IDW (Inverse Distance Weighting) concept may be applied to a grid situation.

A decision is made that at any location one takes into account only traps within a preselected radius, say <300 meter for example. Thus at point U(x1) in FIG. 10, the question is, now many of the surrounding traps are to be taken into account. The closest trap is U4 at 100 m away, the second closest is U2 at 250 m away and U3 at 350 m away comes in at 3rd place.

Figure 11:
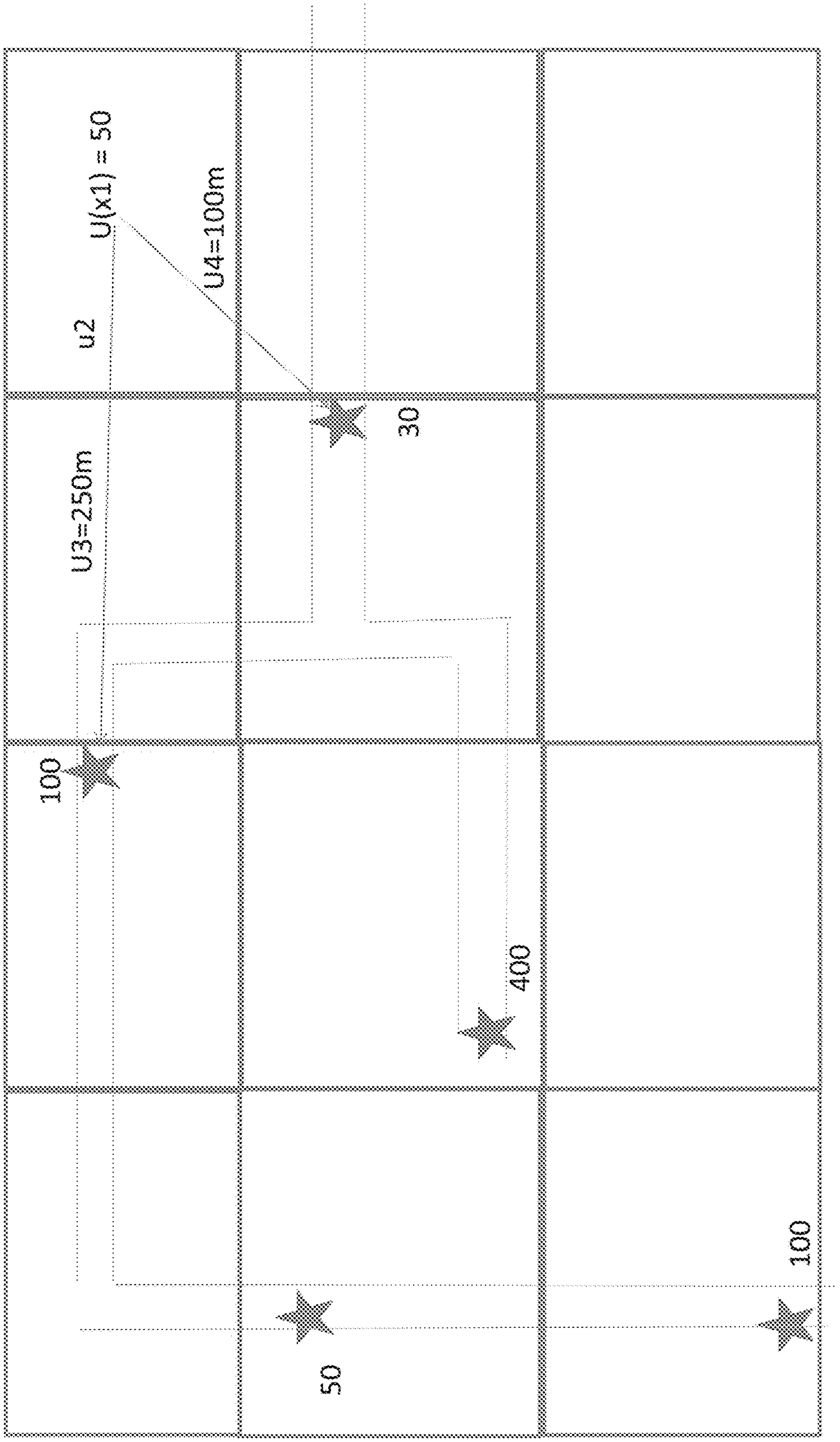
FIG. 11 illustrates a second way of using the weighting algorithm of FIG. 9 for assigning population density values to cells.

As shown in FIG. 11, using just U2 and U4 and weighting for inverse distance gives a U(x1)=50. By contrast, with the simple averages of the previous methods the value 65, the simple average between u3 and u4 would have been used.

Returning to FIG. 10, and taking U3 into account as well, with its lower weighted but larger haul of 400 insects, takes U(x1) up to 109.

As discussed, the assumption is that the effect of the trap is a monotonic decrease with distance.

A weighting has the effect of creating competition in between traps, so that a closer trap with certain number of mosquitoes will have a greater effect than a distant trap with the same number.

In a case where there is only one trap in the entire area of interest then the inverse weighted distance formula may provide all locations with the value of the single trap. Hence, in a worst resourced case, if not enough traps were spread along the area, then all of the release points may be provided with the same value. If there is no trap in the distance selected, then either the distance may be increased or some default value is used. The default may be zero, or may be greater if it is desired to have coverage of the entire area without any area set to zero sterile mosquitoes.

In general, in order to consider a particular trap and its effect on the surroundings, a factor is used to translate the number of captures at the trap to population density in the surroundings. What this factor is can be decided differently depending on the circumstances. The factor can be the reciprocal of the distance, or reciprocal of distance to the second power, based on the assumption that a trap effect is area based so that the effect diminishes by the second power of the radius. Other more complicated assumptions may involve say considering distance from houses and human population, since it is more likely to have mosquitoes near to humans as blood sources, or near stagnant water, and other factors.

In some cases, an expert in the field may select the most suitable formula for how to extrapolate actual numbers of wild mosquitoes and thus required sterile mosquitoes per each cell on the release path on the grid, where the release path may be either an aerial release path or a ground release path.

HOT Spots

Another policy is known as the hotspot strategy. If one wants to be more accurate, it is possible to work according to hot spots rather than cover an entire area. By limiting the distance taken into consideration to be small, say 50-200 meter, then what will happen is that most of the area is marked with "0's" but numbers indicating higher volumes appear in islands around each trap. The hot spot policy is particularly suitable for ground release or for craft with the ability to hover while releasing, say helicopters or quad-copters, and for UAVs in general.

Figure 12:
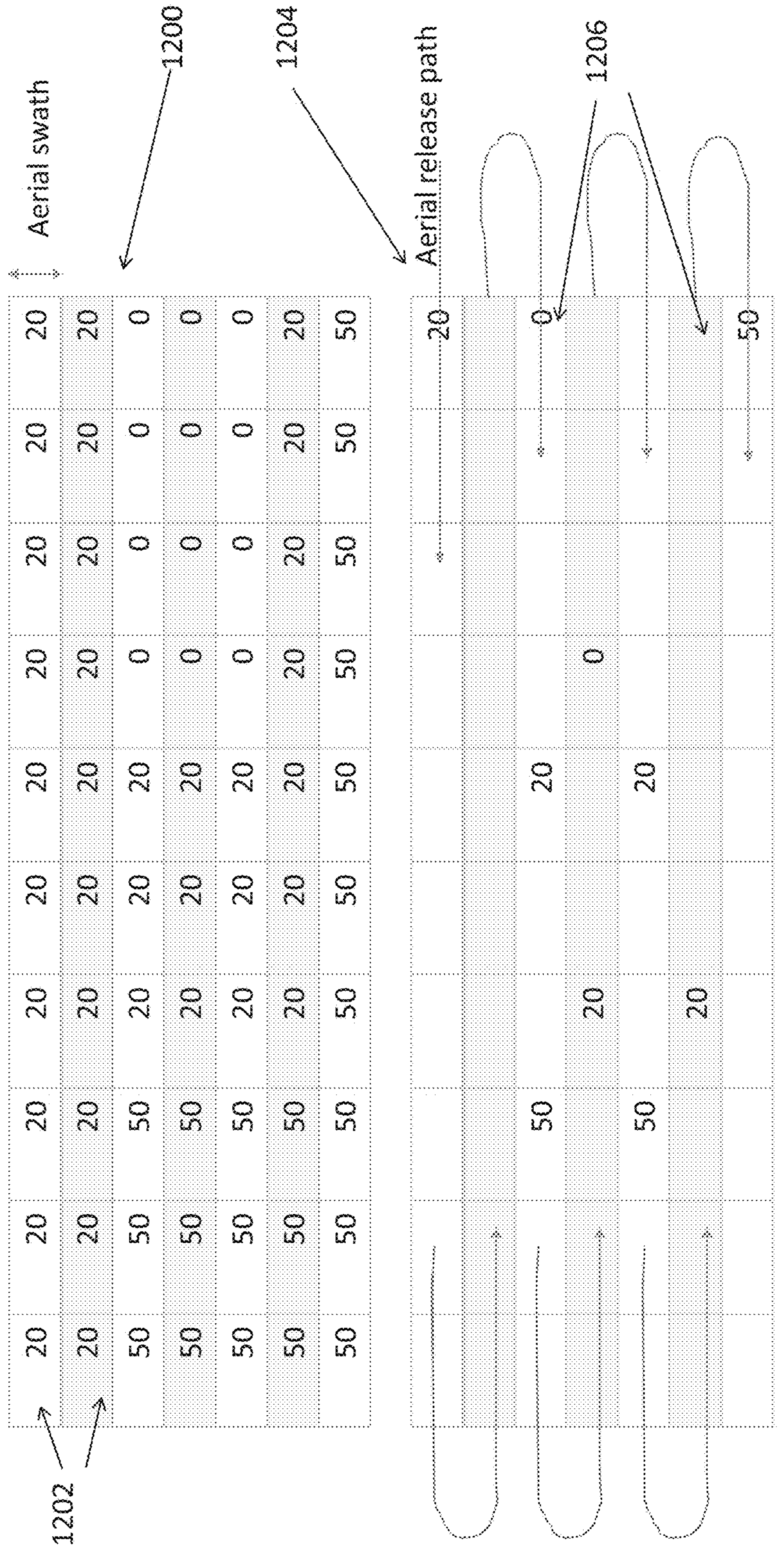
FIG. 12 illustrates two different representations of a region as an aerial release map in cells according to embodiments of the present invention.

The Aerial Release Map:

Reference is now made to FIG. 12, which illustrates cells 1200 in upper map 1202. Each cell containing a number, which is the dosage to be released in that cell. The cells may be correlated with GPS coordinates, and the release system may be designed to automatically release the required dosage according to the release map at the correct GPS coordinates.

Another representation of the release map is delta representation 1204, in which cells 1206 only indicate a number when there is a change over the dosage of the neighbouring cell. The dosage remains fixed unless a change is indicated in the release map.

The aerial release map of the present embodiments may thus address the issue of drift, in that the location in which the insects are released in the air does map to an exact point of arrival on the ground, due for example to technical issues of the release method such as flight speed, due to weather issues such as wind speed, and due to the insects' abilities to fly.

Data is integrated in the process from various sources such as ground traps, indication on the number of cases of infection in the local human population etc, into a single release map.

A regularly updated map may provide an ability to foresee the progress of the mosquitoes and suggest where to "spray" next. Thus there may be a progressive wave front on the map, accumulating data from all traps and advancing in some way.

A smart engine may take into account all data as it arrives and generate a new Release Map.

The smart engine may include a mathematical model which takes into account and/or calculates two things:

1. How are the insects released and how long do they remain under the effect of the release system.

2. Once out of the influence of the aircraft and the release system, what is the insect trajectory as a free falling object.

The above points, while described as two distinct steps, do not have a clean boundary, rather things change gradually in nature. The position (x-y-z) of the released insects may be calculated per each insect for every time t upon release from the aircraft. The closer it is to the aircraft, the higher the aircraft's effect on its flying direction and velocity.

Other factors may be used to take into account insect drag, winds, which may be different for different heights, random flying direction and velocity of the insects etc.

As the computation is complicated, it can be analyzed under different conditions, say different wind combinations, and stored in a computer memory. Then based on actual conditions at release, a suitable simulation may be extracted to evaluate the drift.

Armed with the appropriate simulation, and the required dosages at the ground locations, the smart engine adds the drift to the ground dosage map. Then the insects are released such that their expected drift will bring them to the exact required points on the ground.

Figure 13:
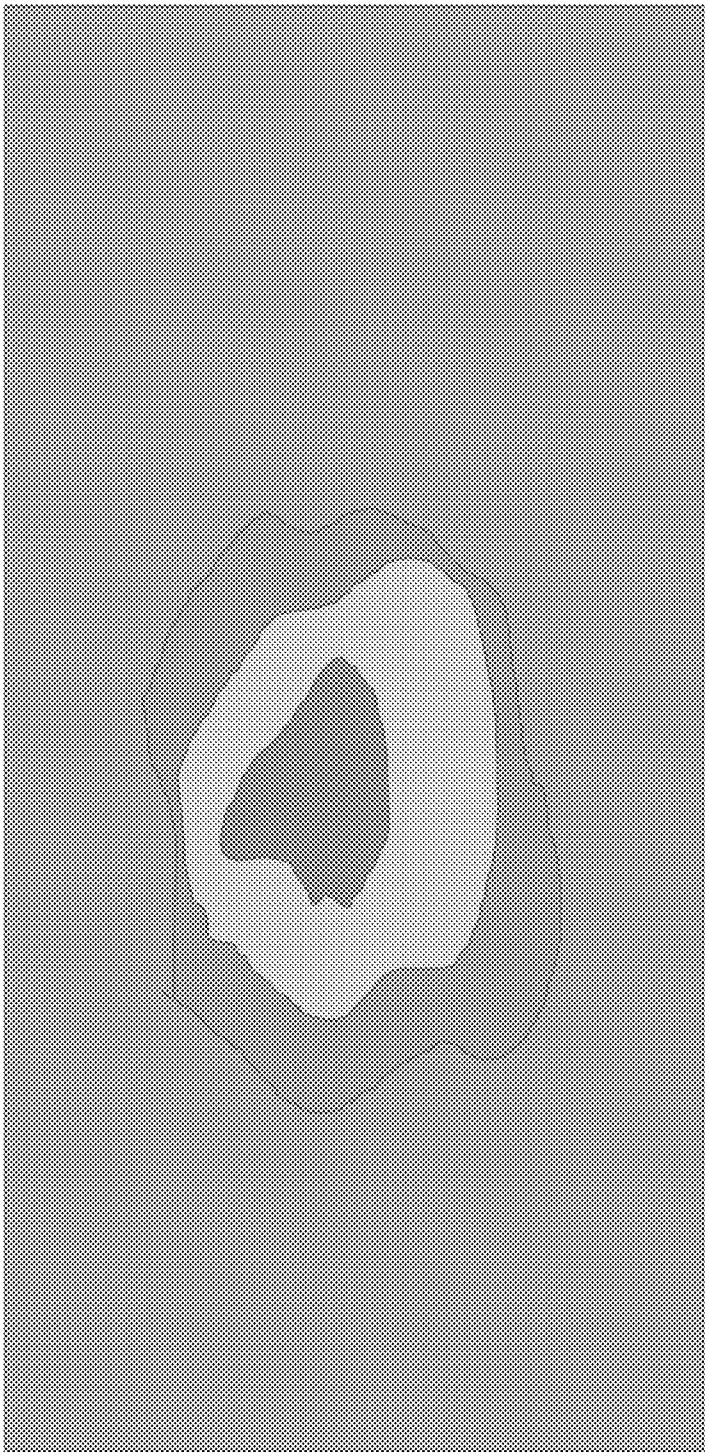
FIG. 13 illustrates a typical ground insect population density map.

FIG. 13 illustrates a representation of a ground release map. The grid is not shown, but different regions indicate different population density on the ground.

An airplane with large storage and fuel tank may perform the entire mission with a single flight, releasing the required dosage.

However, when the mission includes different areas, or the use of smaller vehicles (e.g., drones, quadcopters, ground vehicle etc.), then some optimization can support the mission for better performance. A single flight may not be sufficient, in which case one needs to manage the allocation of release areas to multiple units, or multiple flights.

Figure 14:
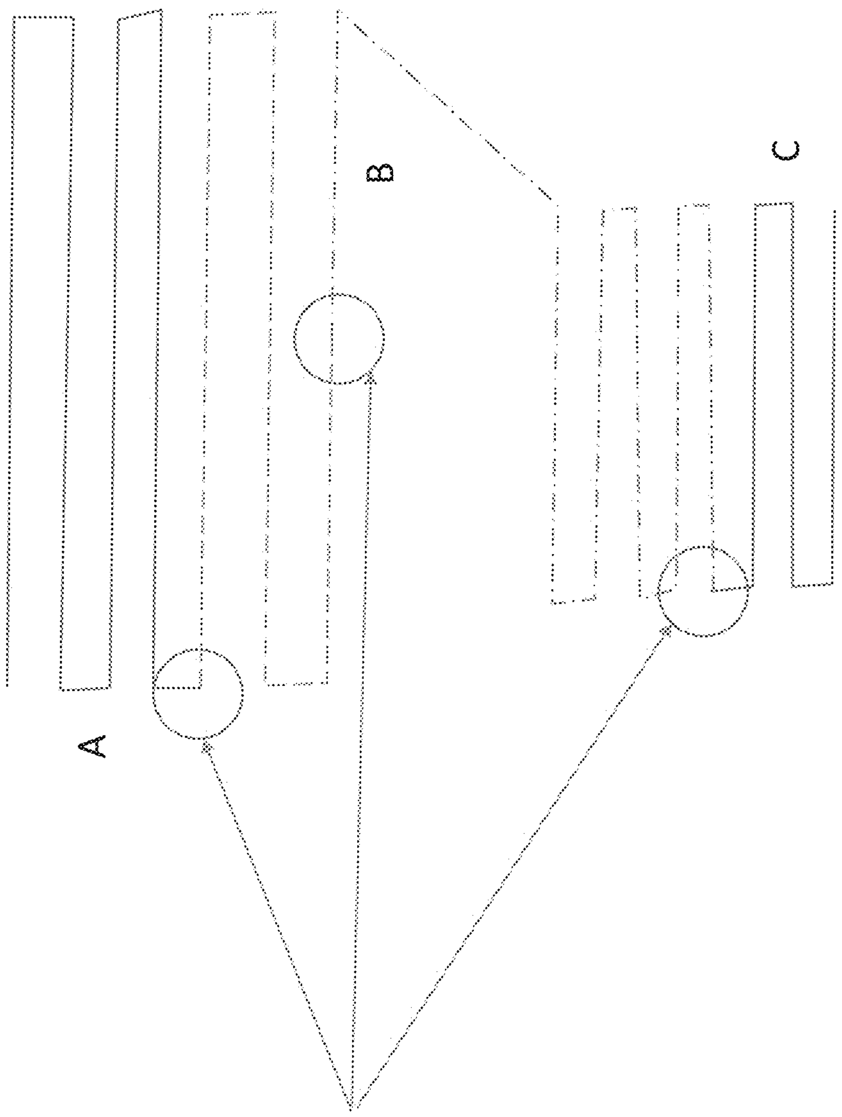
FIG. 14 illustrates a flight path for delivering insects wherein the flight path is divided for multiple release vehicles having different abilities, according to embodiments of the present invention.

Reference is now made to FIG. 14 which shows flight paths A, B and C.

It is assumed that only two drones are available, and that each may have a different capacity, whether in terms of ability to fly longer, or of number of mosquitoes being carried.

Drone A is used for the first segment, while drone B is used for second segment. The first segment is longer because for example the required amount of mosquitoes for that part (coming from the traps analysis) is smaller (release per second, total number etc.), thus with the same drone it is possible to fly longer, without at this point considering energy. Then drone A is reloaded with mosquitoes and starts operation for segment C.

So the central control defines the total required mosquitoes over the entire area, per the subsections flown by the individual drones. The control, say the smart engine discussed above, can output a flight plan based on the available two drones.

The flight plan may include suggested points to charge, reload, and fuel. For example, many drones simply need a power socket to refuel. The plan may define landing sites for the uav/quadcopter/air vehicle, or such details can be set manually.

An exemplary algorithm for providing such a flight path may be based on a cost function as follows:

Starting at the beginning of the first segment, calculate the use of fuel and dosage of mosquitoes and continue doing so as the first drone is advanced along the segments. As the drone runs out of either energy or insects (the limiting resource), it is withdrawn, but is set to carry only that amount of the non-limiting resource compatible with the limiting resource. Thus it makes no sense to carry mosquitoes that will never be released before the fuel runs out. The algorithm then starts the second drone at that point. Of course if there is no second drone then the first drone is refueled and reloaded and used again from that point. But if enough drones are available then the different segments can be sprayed in parallel.

Once the aerial release map for the area is created, then the entire capacity can be calculated and also the length of the entire release path. In practice the release path may differ for different air velocities or flying height or different kinds of craft.

Figure 15:
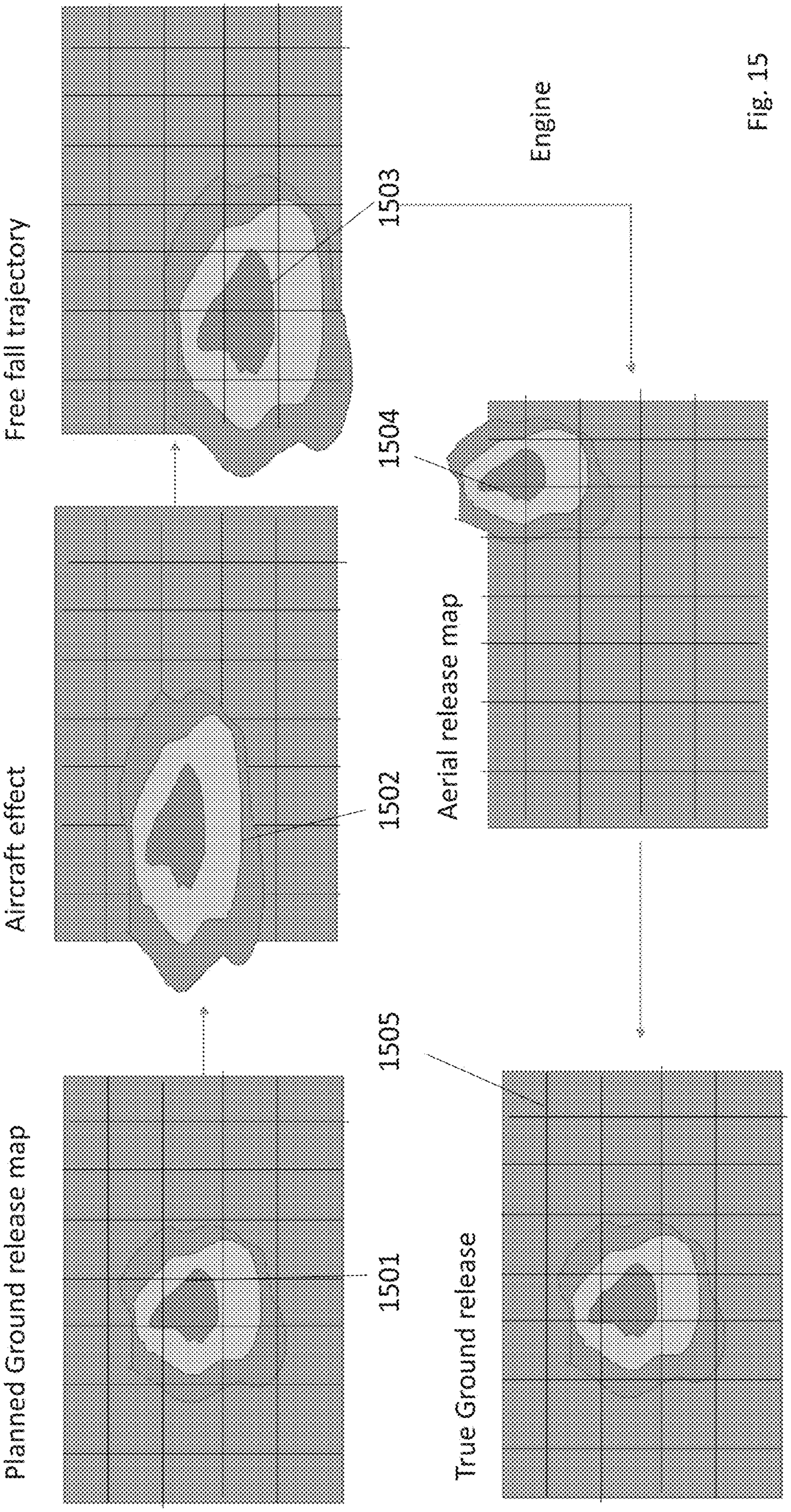
FIG. 15 illustrates the process of modifying the ground distribution of FIG. 13 to provide an aerial distribution map according to embodiments of the present invention.

Reference is now made to FIG. 15, which illustrates ways in which the population density map can be transformed into an aerial release map. Planned ground release map 1501 shows the actual distribution of insects it is intended to achieve on the ground. 1502 shows the effect of the forward motion of the aircraft, and other effects of the mechanical distribution systems to skew the insect distribution and cause considerable scatter. 1503 shows the effect in 1502 and further taking into account freefall and scattering effects of the insects themselves, wind etc. 1504 shows an aerial release map that takes into account the forward motion, free fall and scattering effects and leads to an actual distribution on the ground 1505, that is as close as possible to the planned distribution 1501.

It is noted that, in the course of time after spraying the insects move from the cells in which they are sprayed and merge with the general population.

Figure 16:
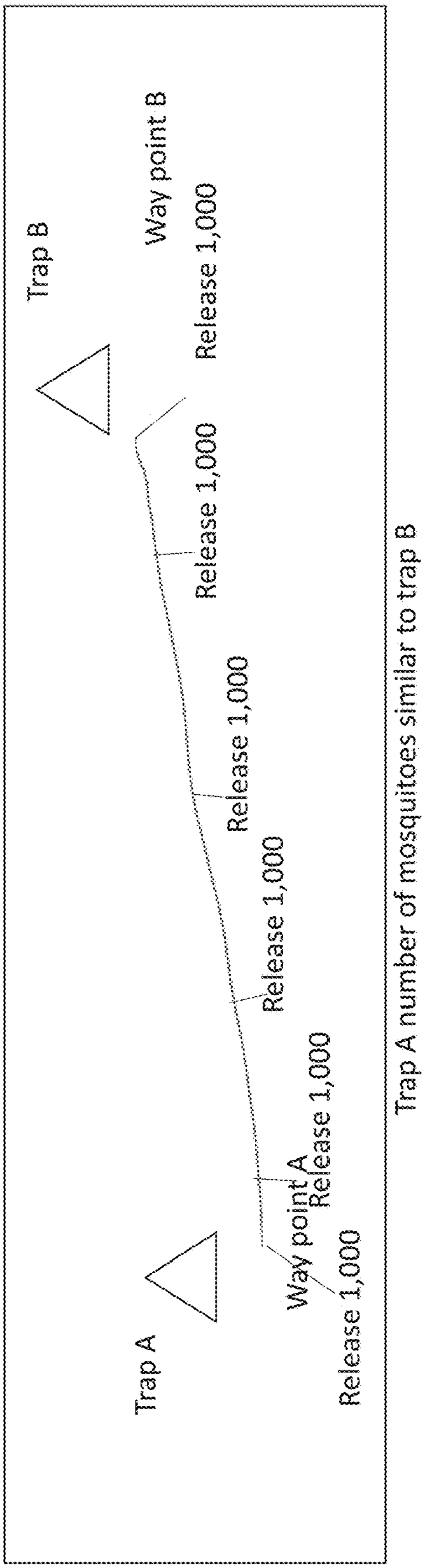
FIG. 16 illustrates a release pattern based on proximity to ground traps.
Figure 16:
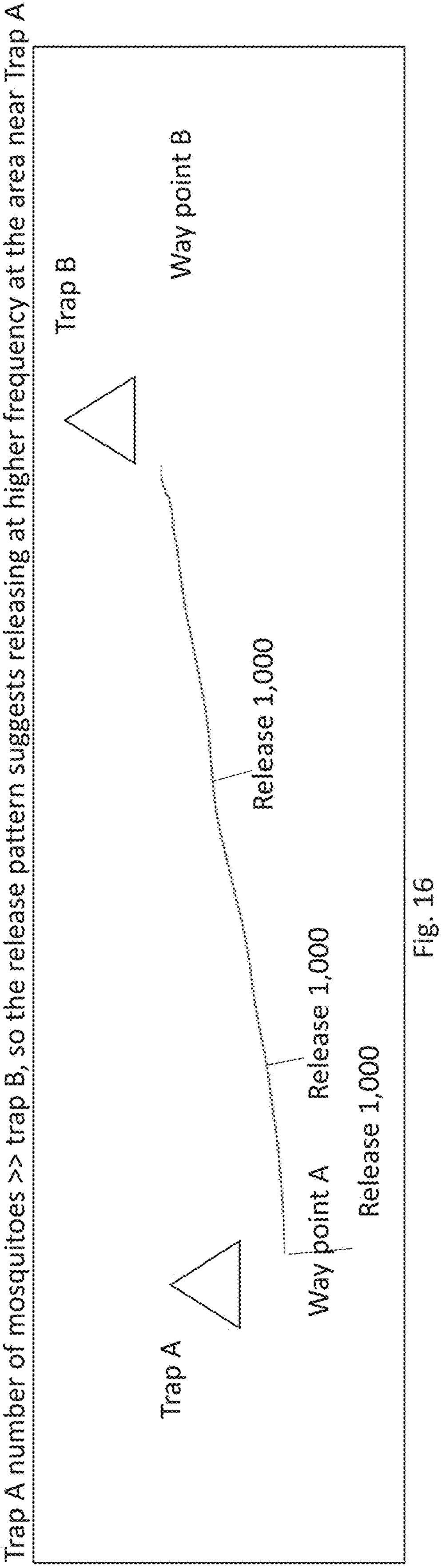

Reference is now made to FIG. 16, which illustrates how GPS coordinates coming from a GPS device may be used to manage distribution of the insects from a release device. The release device is on a vehicle which is travelling with a finite velocity. The method obtains the vehicle velocity, a current GPS location and the density of insects required at the current location. A controller may in one embodiment, automatically fire insects while the vehicle is between a GPS start point and a GPS end point. During that time the system may release insects by opening cartridges, say at regular intervals for every predetermined number of seconds via a firing mechanism.

The cartridges, magazines and frames of magazines may be advanced to continually provide cartridges for release. A feedback loop may optionally be provided indicating actual release events to the controller.

If areas without release are required, then suitable Start and Finish points may be defined and release only occurs after a start point before the first finish point.

Unlike chemical release systems mounted on airplanes and connected to GPS waypoints, the machine and release device of the present embodiments may release a single release cartridge altogether, or every variable number of seconds so that the amount of release can be regulated. This contrasts with current chemical release systems which release the chemicals continuously until they stop.

The duration between each consecutive release may be calibrated and depend on the required density of released insects per square meter, and on the release device (e.g. moving vehicle) speed.

For example if the vehicle is driving at 18 km/hr (5 meter/second), and assuming the firing takes fractions of a second, assuming each cartridge contain 1,000 insects, insects travel on average 100 meters, then the system may be calibrated to fire a cartridge every 20 seconds. Once a cartridge is released, then 20 seconds later the vehicle has moved 100 meters at 5 m/sec. In order to have a coverage of 1,000 insects per ha (10,000 square meter), then the next release position should be at distance of maximum 100 m away parallel to the current firing point.

As shown in FIG. 16, GPS waypoints are actual release points, meaning that for each GPS way point there is a release of insects. The embodiment of FIG. 16 may be preferred if only a smaller number of release points are required per a certain area. A mix is also possible, meaning a first GPS way point of a series of waypoints is the start release point and from that point release happens at each subsequent way point in a set and ends for that session at the last waypoint of that set of waypoints. The method may enable optimizing the use of the valuable resource which is the mosquito or other insect. A GPS waypoint may be correlated with ground traps such as trap A and trap B. GPS waypoints and required release density may be correlated with a number of trapped insects in the corresponding trap. If for example at GPS waypoint A there is a trap that catches a hundred wild insects, and at the closet distant accessible waypoint away where the next trap is located at waypoint B, 10 (ten) insects are caught, then the controller may release more insects closer to GPS waypoint A, and a smaller number of insects during the approach to waypoint B. Such a controlled release may be achieved by reducing the number of cartridges being opened as the vehicle approaches waypoint B along the path. A different rate may be on a different release quantity per each release. A required density on the ground parameter may thus be a dynamic number calculated based on traps and an averaging factor to accommodate trapped number and distance between traps.

Figure 17:
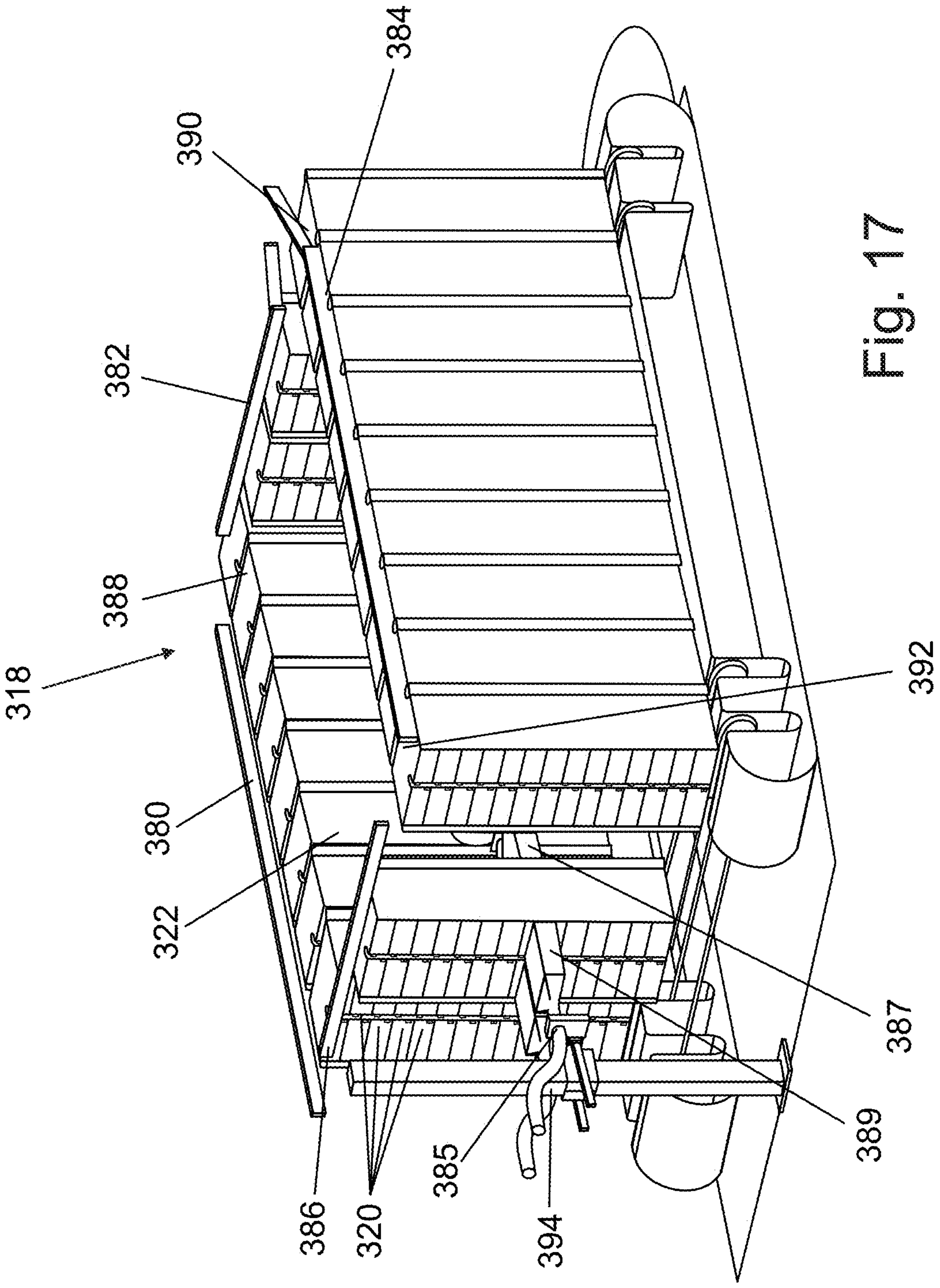
FIG. 17 illustrates a distribution unit made up of magazines and particularly suitable for ground vehicles.

Reference is now made to FIG. 17, which illustrates a magazine holder 318 containing multiple insect cartridges 320 held together in vertically oriented magazines 322. A release mechanism or expulsion mechanism 389 at the front of the holder 318 opens each cartridge in turn of the current magazine and expels the insects. When a magazine is finished, the magazines as a whole move one place clockwise and the process continues with the next magazine until all of the magazines have been emptied. In FIG. 17, supports 380, 382, 384 and 386 hold the magazines against shifting due to motion of the vehicle. Transport elements, for example conveyors, are provided with lift up mechanisms, as known in the art of conveyor belts, which transfer the magazines at the ninety degree turning points 388, 390 and 392. Thus the lift up mechanism moves the magazines to the next conveyor or to the firing point 394 as appropriate. Outer part 385 and inner part 387 of expulsion mechanism 389 are located at the firing location to expel insects from the cartridges and are described in greater detail below. The rails include a lifting mechanism, not shown, to raise the magazines for moving. For example rails and a drive mechanism may lift the magazines from one conveyor to the next. The straight parts of the queues may have conveyors, also not shown.

The embodiment of FIG. 17 is particularly suitable for land vehicles.

Figure 18:
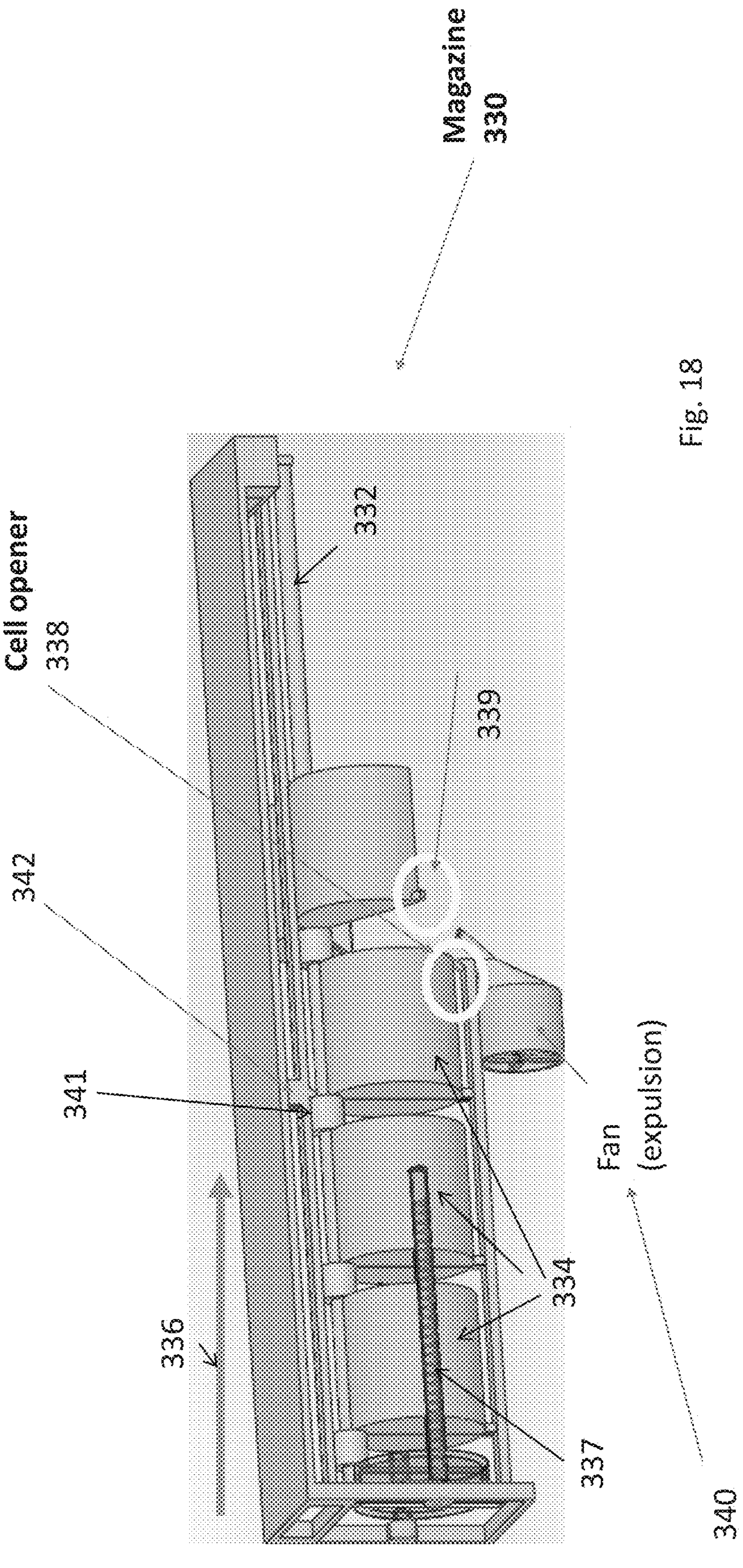
FIG. 18 illustrates a distribution unit suitable for placing under the wing of an autonomous flying vehicle.

Reference is now made to FIG. 18, which is a simplified diagram illustrating a magazine containing multiple cartridges in which the magazine is suitable for underwing placement in an autonomous flying vehicle. Magazine 330 comprises rail 332 on which cartridges 334 ride in the direction of arrow 336. Spring 337 pushes the cartridges 334 along the rail in the direction of arrow 336 A cell opener 338 is located at an opening position and unlocks and opens the cartridges, say by depressing latch 339 on the cartridge, as they reach the opening position in their forward motion. Fan 340 provides an expulsion mechanism for empting the insects and is optional to help disperse the insects from the opened cartridges. Spacers 341 are optionally provided to maintain separation between successive cartridges. Stopper 342 stops the frontmost cartridge from proceeding to the opening position until a signal is given. Typically the spacer 341 of the frontmost cartridge gets held by the stopper 342.

Figure 19:
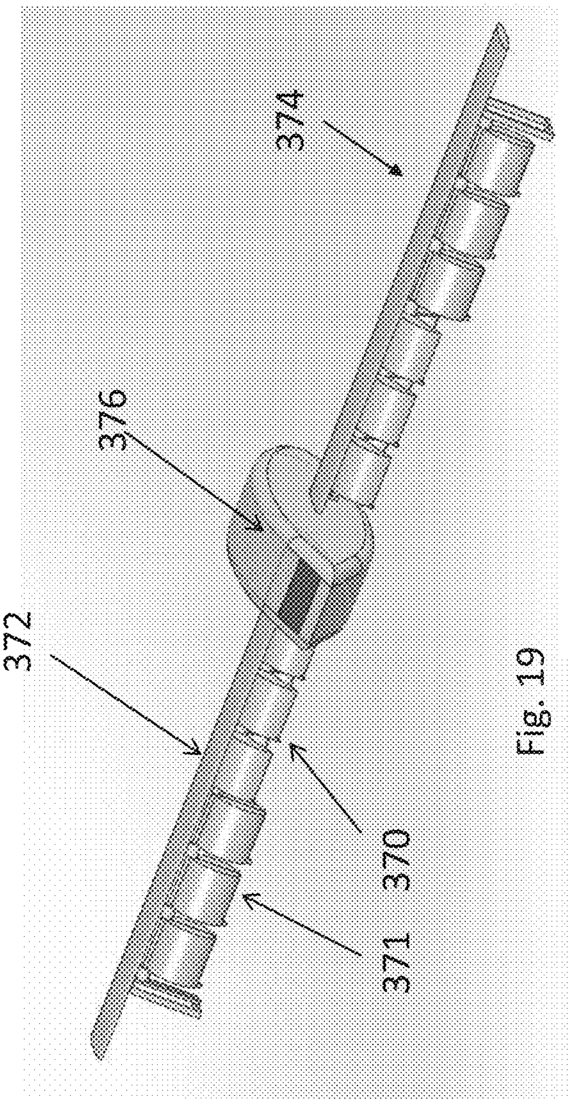
FIG. 19 illustrates an autonomous flying vehicle fitted with the distribution unit of FIG. 18.

FIG. 19 is a simplified schematic diagram showing a perspective view from the front of an autonomous flying vehicle carrying the distribution mechanism of FIG. 18. Open cells 370 and closed cells 371 are lined up along wings 372 and 374 of UAV 376.

It is expected that during the life of a patent maturing from this application many relevant flying and aerial release technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method comprising:

receiving information indicating a population of wild insects within a geographic region;

determining a number of wild insects per unit area within the geographic region;

placing, based on the number of wild insects per unit area, one or more insect release points;

generating an insect release route through the geographic region, the insect release route passing through each insect release point;

following said insect release route with a quantity of bred insects using at least one ground distribution vehicle, said at least one ground distribution vehicle having a respective release resolution and distribution parameters;

modifying a release map according to said respective release resolution and said distribution parameters of said at least one ground distribution vehicle; and round respective ones of said release points releasing a predefined density of insects using said release map.

2. The method of claim 1, further comprising using ground-based data gathering to obtain population density data of a wild insect population around said geographical area, and to generate from said population density data a digital population distribution map of said wild insect population.

3. The method of claim 2, wherein said ground based data gathering comprises arranging traps over said geographic area and using measurements taken from said traps to assign population density numbers to an arrangement of cells applied to said geographical area at a predetermined resolution level.

4. The method of claim 3, comprising assigning to each cell a number based on insect captures at neighboring traps, the captures at each trap being inversely weighted for distance of the respective trap to neighbouring traps.

5. The method of claim 3, comprising assigning to each cell a number based on insect captures at neighboring traps, the captures at each trap being inversely weighted for distance of the respective trap to one member of the group consisting of: houses and water resources.

6. The method of claim 3, comprising assigning to each cell a number being an average between each trap within the cell.

7. The method of claim 3, wherein the cells are equal area release cells.

8. The method of claim 2, comprising:

generating a digital release map by modifying said digital population density map in accordance with said vehicle distribution parameters, the distribution parameters modeling effects of an actual distribution process on said insects carried out with said vehicle such that when said insects are released according to said digital release map they arrive at points on the ground according to said digital population density map.

9. The method of claim 8, wherein said at least one vehicle comprises a plurality of vehicles, said path containing part paths for each of said respective vehicles, each part path based on a release map and respective vehicle distribution parameters and each part path defining said dosages.

10. The method of claim 8, wherein said distribution parameters for a respective vehicle comprise at least one member of the group consisting of:

parameters arising from the motion of the vehicle during distribution;

parameters arising from a mechanical effect on the insects of a distribution mechanism being used;

parameters arising from local weather in the area of the distribution; and parameters arising from flying activity of the insects being distributed.

11. The method of claim 8, wherein said at least one vehicle comprises a plurality of vehicles, and each vehicle is assigned a part of said path, wherein said path is distributed between said plurality of vehicles according to a cost function.

12. The method of claim 1, wherein said following said release route is additionally carried out using a piloted aircraft, the method comprising further modifying the release map according to the release resolution and the distribution parameters of said piloted aircraft.

13. The method of claim 1, wherein said following said release route is additionally carried out using a pilotless drone, the method comprising further modifying the release map according to the release resolution and the distribution parameters of said pilotless drone.

14. The method of claim 1, wherein the at least one distribution vehicle additionally comprises an aerial craft with the ability to hover over a defined location, the method comprising further modifying the release map according to the release resolution and the distribution parameters of said aerial vehicle.

15. The method of claim 1, wherein the insects to be released are one member of the group consisting of mosquitoes and sterile male insects.

16. The method of claim 1, comprising obtaining additional data about said wild population following distribution and provide an updated distribution plan.

17. A non-transitory computer-readable medium comprising processor-executable instructions to cause a processor to:

receive information indicating a population of wild insects within a geographic region;

determine a number of wild insects per unit area within the geographic region;

place, based on the number of wild insects per unit area, one or more insect release points;

generate an insect release route through the geographic region, the insect release route passing through each insect release point; and for each release point define a quantity of insects for release, said release using at least one ground distribution vehicle, the method comprising modifying a release map according to a release resolution and distribution parameters of said at least one ground distribution vehicle, said release map defining said quantity of insects.

* * * * *